United States Patent
Wang

(10) Patent No.: US 10,455,242 B2
(45) Date of Patent: Oct. 22, 2019

(54) SIGNALING OUTPUT INDICATIONS IN CODEC-HYBRID MULTI-LAYER VIDEO CODING

(71) Applicant: QUALCOMM Incorporated, San Diego, CA (US)

(72) Inventor: Ye-Kui Wang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 716 days.

(21) Appl. No.: 14/638,518

(22) Filed: Mar. 4, 2015

(65) Prior Publication Data
US 2016/0261877 A1    Sep. 8, 2016

(51) Int. Cl.
*H04N 19/30* (2014.01)
*H04N 19/597* (2014.01)

(52) U.S. Cl.
CPC ........... *H04N 19/30* (2014.11); *H04N 19/597* (2014.11)

(58) Field of Classification Search
CPC .............................. H04N 19/30; H04N 19/597
USPC ................................................... 375/240.12
See application file for complete search history.

(56) References Cited

U.S. PATENT DOCUMENTS

| | | | | |
|---|---|---|---|---|
| 9,313,486 | B2* | 4/2016 | Boyce | ............... H04N 19/70 |
| 9,706,199 | B2* | 7/2017 | Ugur | ................. H04N 19/46 |
| 2007/0200923 | A1* | 8/2007 | Eleftheriadis | .......... H04N 7/152 348/14.08 |
| 2008/0095228 | A1* | 4/2008 | Hannuksela | ........... H04N 19/70 375/240.01 |
| 2011/0216833 | A1* | 9/2011 | Chen | .................... H04N 19/597 375/240.16 |

(Continued)

FOREIGN PATENT DOCUMENTS

| | | | | |
|---|---|---|---|---|
| WO | WO-2015047162 A1 * | 4/2015 | ............. | H04N 19/70 |
| WO | WO 2015057124 A1 * | 4/2015 | ........... | H04N 19/187 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Richard A Hansell, Jr.
(74) *Attorney, Agent, or Firm* — Shumaker & Sieffert, P.A.

(57) ABSTRACT

Techniques are described for sending output indications in codec-hybrid multi-layer video coding, in which a base layer of video data is provided by an external system and conforms to a different video codec standard than one or more enhancement layers of the video data. An enhancement layer video decoder receives an enhancement layer bitstream that includes at least one enhancement layer to be decoded, an indication that the base layer is provided externally, and an indication of which layers are target output layers to be output for display. The external system does not receive a target output layer indication in a base layer bitstream. The disclosed techniques enable the enhancement layer video decoder, when the base layer is provided by the external system, to send an output indication to the external system indicating whether the base layer or specific base layer decoded pictures need to be output for display.

14 Claims, 7 Drawing Sheets

(56) References Cited

U.S. PATENT DOCUMENTS

| | | | |
|---|---|---|---|
| 2012/0224644 A1* | 9/2012 | Wang | H04N 19/174 375/240.25 |
| 2013/0322531 A1* | 12/2013 | Chen | H04N 19/30 375/240.12 |
| 2014/0119437 A1* | 5/2014 | Chen | H04N 19/597 375/240.12 |
| 2014/0169466 A1* | 6/2014 | Liu | H04N 19/593 375/240.12 |
| 2014/0218473 A1* | 8/2014 | Hannuksela | H04N 19/597 348/43 |
| 2014/0219346 A1* | 8/2014 | Ugur | H04N 19/105 375/240.12 |
| 2014/0355693 A1* | 12/2014 | Chen | H04N 19/597 375/240.26 |
| 2015/0189298 A1* | 7/2015 | Ye | H04N 19/196 375/240.02 |
| 2015/0195528 A1 | 7/2015 | Wang | |
| 2015/0195529 A1 | 7/2015 | Wang | |
| 2015/0195548 A1 | 7/2015 | Wang | |
| 2015/0195549 A1 | 7/2015 | Wang | |
| 2015/0195561 A1 | 7/2015 | Wang et al. | |
| 2015/0195577 A1* | 7/2015 | Hannuksela | H04N 19/44 375/240.25 |
| 2015/0264370 A1* | 9/2015 | Ramasubramonian | H04N 19/33 375/240.02 |
| 2015/0264404 A1* | 9/2015 | Hannuksela | H04N 19/70 375/240.16 |
| 2016/0057439 A1* | 2/2016 | Yamamoto | H04N 19/51 375/240.12 |
| 2016/0088306 A1* | 3/2016 | Sjoberg | H04N 19/187 |
| 2016/0191931 A1* | 6/2016 | Hannuksela | H04N 19/105 375/240.12 |
| 2016/0234517 A1* | 8/2016 | Samuelsson | H04N 19/70 |
| 2017/0180744 A1* | 6/2017 | Deshpande | H04N 19/70 |

FOREIGN PATENT DOCUMENTS

| | | | | |
|---|---|---|---|---|
| WO | WO-2015057124 A1 * | 4/2015 | | H04N 19/187 |
| WO | WO 2015125494 A1 * | 8/2015 | | H04N 19/70 |
| WO | WO-2015125494 A1 * | 8/2015 | | H04N 19/70 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTCI/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Tech, et al., "3D-HEVC Draft Text 2," (Joint Collaborative Team on Video Coding of ISO/IEC JTC1/SC29/WG11 and ITU-T SG.16); Oct. 25-Nov. 1, 2013; Document No. JCT3V-F1001_v4, Dec. 14, 2013; 94 pp.

Tech, et al., "MV-HEVC Draft Text 6," (Joint Collaborative Team on Video Coding of ISO/IEC JTC1/SC29/WG11 and ITU-T SG.16); Oct. 25-Nov. 1, 2013; Document No. JCT3V-F1004_v6, Nov. 30, 2013; 109 pp.

Wang, et al., "High Efficiency Video Coding (HEVC) Defect Report 2," (Joint Collaborative Team on Video Coding of ISO/IEC JTC1/SC29/WG11 and ITU-T SG.16); Oct. 23-Nov. 1, 2013; Document No. JCTVC-O1003_v2, Nov. 24, 2013; 311 pp.

Chen, et al., "High efficiency video coding (HEVC) scalable extension Draft 4," (Joint Collaborative Team on Video Coding of ISO/IEC JTC1/SC29/WG11 and ITU-T SG.16); Oct. 23-Nov. 1, 2013; Document No. JCTVC-O1008_v3, Dec. 7, 2013, 106 pp.

Chen, et al., "High efficiency video coding (HEVC) scalable extensions Draft 5," (Joint Collaborative Team on Video Coding of ISO/IEC JTC1/SC29/WG11 and ITU-T SG.16); Jan. 9-17, 2014, Document No. JCTVC-P1008_v4, Jan. 22, 2014; 125 pp.

Wang, et al., "AHG15: Support of hybrid scalability," (Joint Collaborative Team on Video Coding of ISO/IEC JTC1/SC29/WG11 and ITU-T SG.16); Mar. 27-Apr. 4, 2014, Document No. JCTVC-Q0042_v1, Mar. 6, 2014; 3 pp.

* cited by examiner

SIGNALING OUTPUT INDICATIONS IN CODEC-HYBRID MULTI-LAYER VIDEO CODING

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-layer coding bitstream may include two or more layers of video data. In the context of scalable video coding, a layer typically corresponds to coded pictures having video characteristics, e.g., spatial resolution and quality level, different than coded pictures in other layers. In some scalable video coding standards, temporal scalability may be achieved within one layer by defining a group of pictures with a particular temporal level as a sub-layer. In the context of multiview video coding, a layer may be equivalent to a view encoded from one perspective, which is different than perspectives of encoded views in other layers. For example, different layers may transmit left and right eye views to support 3D video. Each view component may be a coded picture of a video scene belonging to a specific view at a specific time instance. In multiview video coding, a layer can contain all view components of the same layer with different time instances. Alternatively, some 3D video coding processes may apply so-called multiview plus depth coding. In multiview plus depth video coding, a layer may contain either all coded depth pictures of a specific view or all coded texture pictures of a specific view.

SUMMARY

In general, this disclosure describes techniques for improved support of codec-hybrid multi-layer video coding, in which one layer of video data is coded according to a first video codec standard that is different than a second video codec standard used to code another layer of the video data. In one example, a base layer of video data may be coded according to the H.264/AVC standard and one or more enhancement layers of the video data may be coded according to one of the multi-layer extensions of the H.265/HEVC standard. In codec-hybrid multi-layer video coding, the base layer is provided by an external system, e.g., a base layer video encoder and/or decoder or a control system for a base layer video encoder and/or decoder, different than a video encoder and/or video decoder configured to code the one or more enhancement layers.

The techniques of this disclosure are directed toward signaling output indications in codec-hybrid multi-layer video coding. Conventionally, the enhancement layer video decoder receives an indication of which layers are target output layers to be output for display, but the external system does not receive such an indication and does not know whether the base layer should be output for display. The disclosed techniques enable the enhancement layer video decoder to send an output indication to the external system indicating whether the base layer or specific base layer decoded pictures need to be output. In addition, this disclosure specifies bitstream conformance and decoder conformance for codec-hybrid multi-layer video coding where the base layer is provided externally and potentially with a different video codec standard than HEVC.

In one example, this disclosure is directed to a method of decoding video data, the method comprising receiving, at a video decoder, a bitstream including at least one enhancement layer of video data to be decoded; determining that a base layer of the video data is provided by an external system; determining one or more target output layers of the video data; based on the target output layers including the at least one enhancement layer, outputting enhancement layer decoded pictures that belong to the at least one enhancement layer for display; and sending an output indication to the external system indicating whether base layer decoded pictures that belong to the base layer are to be output for display.

In another example, this disclosure is directed to a video decoding device comprising a memory configured to store video data; and one or more processors in communication with the memory. The one or more processors are configured to receive a bitstream including at least one enhancement layer of video data to be decoded, determine that a base layer of the video data is provided by an external system, determine one or more target output layers of the video data, based on the target output layers including the at least one enhancement layer, output enhancement layer decoded pictures that belong to the at least one enhancement layer for display, and send an output indication to the external system indicating whether base layer decoded pictures that belong to the base layer are to be output for display.

In a further example, this disclosure is directed to a video encoding device comprising a memory configured to store video data; and one or more processors in communication with the memory. The video encoding device is configured to determine that a base layer of the video data is provided by an external system, encode enhancement layer pictures that belong to at least one enhancement layer of the video data, and generate a bitstream including the enhancement layer encoded pictures that belong to the at least one enhancement layer, and without including any base layer encoded pictures that belong to the base layer.

The details of one or more examples are set forth in the accompanying drawings and the description below. Other features, objects, and advantages will be apparent from the description and drawings, and from the claims.

DETAILED DESCRIPTION

Figure 1:
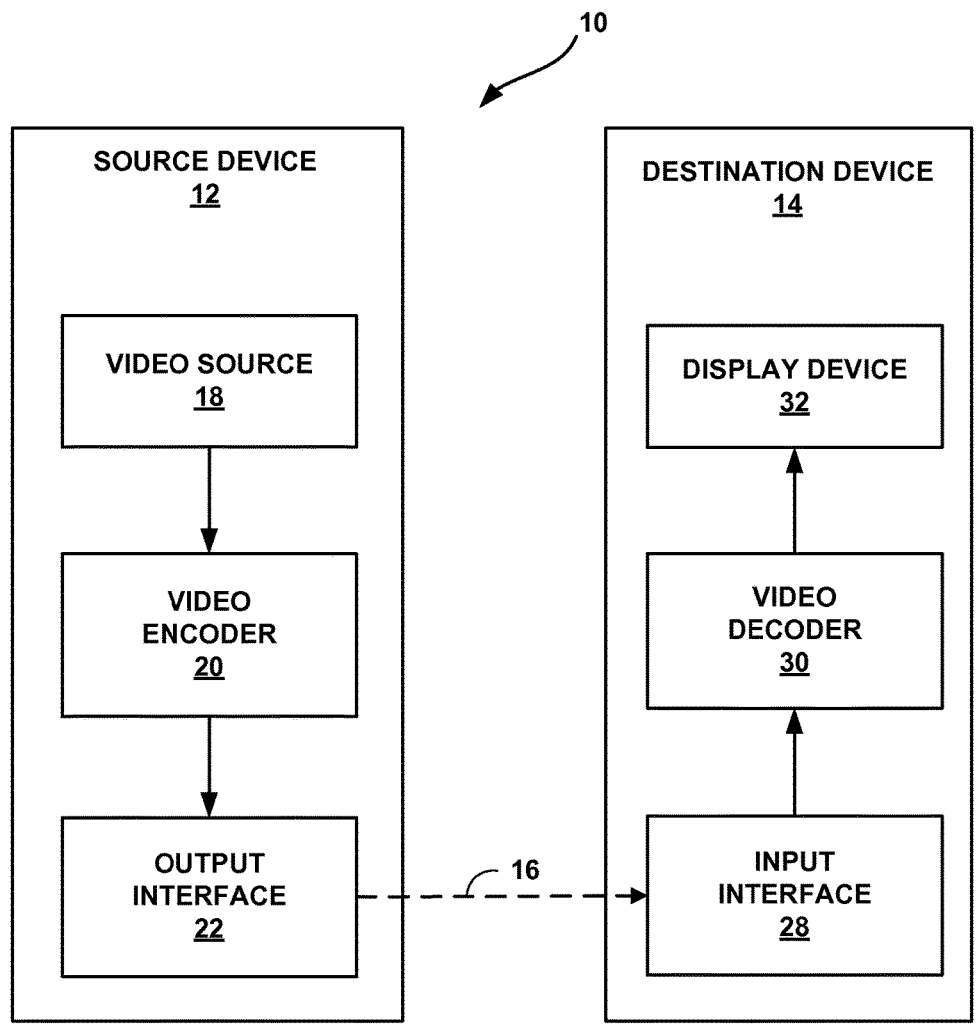
FIG. 1 is a block diagram illustrating an example video encoding and decoding system that may support codec-hybrid multi-layer video coding in accordance with the techniques of this disclosure.

This disclosure describes techniques for improved support of codec-hybrid multi-layer video coding, in which one layer of video data is coded according to a first video codec standard that is different than a second video codec standard used to code another layer of the video data. The multi-layer video coding may be in accordance the High Efficiency Video Coding (HEVC) standard, including any of a scalable video coding extension (SHVC), a multiview video coding extension (MV-HEVC), a 3D video coding (i.e., multiview video coding plus depth) extension (3D-HEVC), or other multi-layer video coding extensions to HEVC. In one example of codec-hybrid multi-layer video coding, a base layer of video data may be coded according to the H.264/AVC standard and one or more enhancement layers of the video data may be coded according to one of the multi-layer extensions of the H.265/HEVC standard. In another example, the base layer may conform to the H.265/HEVC base specification and the enhancement layers may conform to one of the multi-layer HEVC extensions e.g., SHVC, MV-HEVC, or 3D-HEVC.

In codec-hybrid multi-layer video coding, because a base layer of video data conforms to a first video coding standard that is different than a second video coding standard to which one or more enhancement layers of the video data conform, the base layer is provided by an external system different from a video encoder and/or video decoder configured to code the one or more enhancement layers. The external system may be, for example, a base layer video encoder and/or decoder or a control system for a base layer video encoder and/or decoder such as a server, a media-aware network element (MANE), a video editor/splicer, or other such device. In an example where the base layer conforms to the AVC standard and the one or more enhancement layers conform to the SHVC standard, the external system may be a base layer video encoder and/or decoder configured to code video data according to the AVC standard whereas an enhancement layer video encoder and/or decoder is configured to code video data according to the SHVC standard.

The techniques of this disclosure are directed toward signaling output indications in codec-hybrid multi-layer video coding. The enhancement layer video decoder receives an enhancement layer bitstream that includes at least one enhancement layer to be decoded, an indication that the base layer is provided externally, and an indication of which layers are target output layers to be output for display. The external system, however, does not receive such an indication in a base layer bitstream and does not know whether the base layer should be output for display. The disclosed techniques enable the enhancement layer video decoder to send an output indication to the external system indicating whether the base layer or specific base layer decoded pictures need to be output for display. In one example, when the base layer is provided by the external system, the enhancement layer decoder signals a flag to the external system indicating whether or not the base layer is identified as a target output layer to be output for display. In another example, when the base layer is provided by the external system, the enhancement layer decoder signals a flag for each base layer decoded picture of the base layer to the external system indicating whether or not a respective base layer decoded picture is to be output for display.

In addition, this disclosure specifies bitstream conformance and decoder conformance for codec-hybrid multi-layer video coding where the base layer is provided externally and potentially using a different video codec standard than HEVC. According to the techniques described in this disclosure, when the base layer is provided by the external system, a video encoder generates conforming bitstreams that include enhancement layer encoded pictures that belong to at least one enhancement layer, without including any base layer encoded pictures that belong to the base layer. According to the disclosed techniques, when the base layer is provided by the external system, a conforming video decoder decodes conforming bitstreams, outputs enhancement layer decoded pictures that belong to an enhancement layer identified as a target output layer, and sends output indications for the base layer to the external system.

Video coding standards include ITU-T H.261, ISO/IEC MPEG-1 Visual, ITU-T H.262 or ISO/IEC MPEG-2 Visual.

ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

The design of a new video coding standard, namely HEVC, has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, referred to as the HEVC spec, Wang et al., "High efficiency video coding (HEVC) Defect Report 2," Joint Collaborative Team on Video Coding (JCT-VC) of ITU-T SG16 WP3 and ISO/IEC JTC1/SC29/WG11, 15th Meeting: Geneva, CH, 23 Oct.-1 Nov. 2013, JCTVC-O1003v2, is available from http://phenix.int-evry.fr/jctidoc_end_user/documents/15_Geneva/wg11/JCTVC-O1003-v2.zip. The finalized standard for HEVC is included in International Telecommunication Union (ITU), Telecommunication Standard Sector of ITU, "Series H: Audiovisual and Multimedia Systems, Infrastructure of audiovisiual services-Coding of moving video, High efficiency video coding," Recommendation ITU-T H.265, April 2013.

The multiview extension to HEVC (MV-HEVC) and another HEVC extension for more advanced 3D video coding (3D-HEVC) are being developed by the JCT-3V. A draft specification of MV-HEVC, referred to as MV-HEVC Working Draft 6 (WD6), Tech et al., "MV-HEVC Draft Text 6," Joint Collaborative Team on 3D Video Coding Extension Development (JCT-3V) of ITU-T SG16 WP3 and ISO/IEC JTC1/SC29/WG11, 6th Meeting: Geneva, CH, 25 Oct.-1 Nov. 2013, JCT3V-F1004v6, is available from http://phenix.int-evry.frijct/doc_end_user/documents/6_Geneva/wg11/JCT3V-F1004-v6.zip. A draft specification of 3D-HEVC, referred to as 3D-HEVC Working Draft 2 (WD2) and described in Tech et al., "3D-HEVC Draft Text 2," Joint Collaborative Team on 3D Video Coding Extension Development (JCT-3V) of ITU-T SG 16 WP 3 and ISO/IEC JTC 1/SC 29/WG11, 6th Meeting: Geneva, CH, 25 Oct.-1 Nov. 2013, JCT3V-F1001v4, is available from http://phenix.it-sudparis.eu/jct2/doc_end_user/documents/6_Geneva/wg11/JCT3V-F1001-v4.zip.

The scalable extension to HEVC (SHVC) is being developed by the JCT-VC. A draft specification of SHVC, referred to as SHVC Working Draft 4 (WD4), Chen et al., "High efficiency video coding (HEVC) scalable extension Draft 4." Joint Collaborative Team on Video Coding (JCT-VC) of ITU-T SG 16 WP3 and ISO/IEC JTC1/SC29/WG11, 15th Meeting: Geneva, CH, 23 Oct.-1 Nov. 2013, JCTVC-O1008v3, is available from http://phenix.int-evry.fr/jct/doc_end_user/documents/15_Geneva/wg11/JCTVC-O1008-v3.zip. A more recent draft specification of SHVC, referred to as SHVC Working Draft 5 (WD5). Chen et al., "High efficiency video coding (HEVC) scalable extension Draft 5," Joint Collaborative Team on Video Coding (JCT-VC) of ITU-T SG16 WP3 and ISO/IEC JTC1/SC29/WG11, 16th Meeting: San Jose, US, 9-17 Jan. 2014, JCTVC-P1008v4, is available from http://phenix.int-evry.fr/jct/doc_end_user/documents/16_San Jose/wg11/JCTVC-P1008-v4.zip.

FIG. 1 is a block diagram illustrating an example video encoding and decoding system 10 that may support codec-hybrid multi-layer video coding in accordance with the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for processing video data in parallel. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data in parallel may be performed by any digital video encoding and/or decoding device. In some examples, the techniques may be performed by a combined video encoder/decoder, typically referred to as a "codec," that enables compression or decompression of digital video according to a video coding standard. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 and video decoder 30 may be included in one or more encoders or decoders, either of which may be integrated as part of a combined encoder/decoder ("codec") in a respective device. In some examples, video encoder 20 and video decoder 30 may each be included in a so called "codec-hybrid" that includes a base layer encoder or a base layer decoder that operates according to a first video codec standard, and also includes one or more enhancement layer encoders or enhancement layer decoders that operate according a different, second video codec standard.

For example, the base layer encoders or decoders included in the codec-hybrid may operate according to the Advanced Video Coding (AVC) standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based three-dimensional video (3DV) extension. Other examples of video coding standards include ITU-T H.261, ISO/IEC MPEG-1 Visual, ITU-T H.262 or ISO/IEC MPEG-2 Visual, and ITU-T H.263.

Video encoder 20 and video decoder 30 in the codec-hybrid may also operate as enhancement layer encoders or decoders according to the High Efficiency Video Coding (HEVC) standard finalized by the Joint Collaboration Team on Video Coding (JCT-VC) of ITU-T Video Coding Experts Group (VCEG) and ISO/IEC Motion Picture Experts Group (MPEG). The HEVC draft specification, referenced above, is referred to as the HEVC spec. The MV-HEVC and 3D-HEVC standards are being developed by the JCT-3V. A recent draft specification of MV-HEVC is referred to as MV-HEVC WD6, and a recent draft specification of 3D-HEVC is referred to as 3D-HEVC WD2. The SHVC standard is being developed by the JCT-VC. A recent draft specification of SHVC is referred to as SHVC WD5.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20, in an HEVC encoding process, may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in a raster scan pattern.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that has three separate color planes, a CU may comprise a single coding block and syntax structures used to code the samples of the coding block.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice.

Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a sequence parameter set (SPS), a picture parameter set (PPS) or a video parameter set; a second type of NAL unit may encapsulate a RBSP for a coded slice; a third type of NAL unit may encapsulate a RBSP for Supplemental Enhancement Information (SEI), and so on. Each of the SPS, PPS and VPS is a syntax structure that may contain syntax elements that apply to zero or more entire coded video sequences or entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 receives a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

In MV-HEVC, 3D-HEVC, and SHVC, video encoder 20 may generate a multi-layer bitstream that comprises a series of network abstraction layer (NAL) units. Different NAL units of the bitstream may be associated with different layers of the bitstream. In some cases, a set of video coding layer (VCL) NAL units may form an access unit. Each access unit may include the VCL NAL units for coded pictures or slices at the same time instance across multiple layers. A layer may be defined as a set of VCL NAL units and associated non-VCL NAL units that have the same layer identifier. A layer may be equivalent to a view in multiview video coding. In multiview video coding, a layer can contain all view components of the same layer with different time instances. Each view component may be a coded picture of the video scene belonging to a specific view at a specific time instance. In 3D video coding, a layer may contain either all coded depth pictures of a specific view or coded texture pictures of a specific view. Similarly, in the context of scalable video coding, a layer typically corresponds to coded pictures having video characteristics different from coded pictures in other layers. Such video characteristics typically include spatial resolution and quality level (Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in one or more enhancement layers. NAL units only encapsulate data of a single layer. In SHVC, a view may be referred to as a "base layer" if video decoder 30 can decode pictures in the view without reference to data of any other layer. Thus, NAL units encapsulating data of the highest remaining layer of the bitstream may be removed from the bitstream without affecting the decodability of data in the remaining lower layers of the bitstream. In MV-HEVC and 3D-HEVC, higher layers may include additional view components. In SHVC, higher layers may include signal to noise ratio (SNR) enhancement data, spatial enhancement data, and/or temporal enhancement data.

In some examples, data in a higher layer may be decoded with reference to data in one or more lower layers. The lower layers may be used as reference pictures to compress the higher layer using inter-layer or inter-view prediction. The data of the lower layers may be up-sampled to have the same resolution as the higher layers. In general, video encoder 20 and video decoder 30 may perform inter-layer prediction in a similar manner as inter prediction described above, except one or more up-sampled lower layers may be used as reference pictures as opposed to one or more neighboring pictures.

This disclosure describes improvements for support of codec-hybrid multi-layer video coding, in which one layer of video data is coded according to a first video codec standard that is different than a second video codec standard used to code another layer of the video data. The multi-layer video coding may be in accordance with the HEVC standard, including any of SHVC, MV-HEVC, 3D-HEVC, or other multi-layer video coding extensions to HEVC. In one example of codec-hybrid multi-layer video coding, a base layer of video data may be coded according to the H.264/AVC standard and one or more enhancement layers of the video data may be coded according to one of the multi-layer extensions of the H.265/HEVC standard. In another example, the base layer may conform to the H.265/HEVC base specification and the enhancement layers may conform to one of the multi-layer HEVC extensions.

In codec-hybrid multi-layer video coding, because a base layer conforms to a first video coding standard that is different than a second video coding standard to which one or more enhancement layers conform, the base layer is provided by an external system to a video encoder and/or video decoder configured to code the one or more enhancement layers. The external system may be, for example, a base layer video encoder and/or decoder or a control system for a base layer video encoder and/or decoder such as a server, a media-aware network element (MANE), a video editor/splicer, or other such device. In the example where the base layer conforms to the AVC standard and the enhancement layers conform to the SHVC standard, the external system may be a base layer video encoder and/or decoder configured to code video data according to the AVC standard whereas an enhancement layer video encoder and/or decoder is configured to code video data according to the SHVC standard.

The techniques of this disclosure relate to signaling of output indications by the enhancement layer video decoder to the external system indicating whether base layer decoded pictures of the base layer are to be output for display. In general, the enhancement layer video decoder receives an enhancement layer bitstream that includes at least one enhancement layer and an indication of which layers are target output layers to be output for display. The external system, however, does not receive such an indication of the target output layers in a base layer bitstream. The external system, therefore, does not know which layers are target output layers and, more importantly, does not know whether the base layer should be output for display or whether specific base layer decoded pictures of the base layer should be output for display. The disclosed techniques enable the enhancement layer video decoder to send an output indication to the external system indicating whether the base layer or specific base layer decoded pictures need to be output.

Techniques for supporting codec-hybrid multi-layer video coding have been described in a first disclosure (U.S. application Ser. No. 14/584,473, filed Dec. 29, 2014, and U.S. Provisional Application No. 61/923,529, filed Jan. 3, 2014) and a second disclosure (U.S. application Ser. Nos. 14/590,897; 14/590,922; 14/590,924; and 14/590,914, each filed Jan. 6, 2015, and U.S. Provisional Application No. 61/925,149, filed Jan. 8, 2014). These techniques described in the first and second disclosures specifically describe support of an H.264/AVC base layer with SHVC enhancement layers.

For example, the first disclosure described the following design rules for video encoders and video decoders to support codec-hybrid multi-layer video coding.

For a current access unit, either no information is provided (meaning no base layer picture is present for the current access unit) or the following information of the base layer picture is provided by an external system (e.g., a base layer encoder/decoder):
  The decoded sample values of the base layer decoded picture.
  The representation format of the base layer decoded picture, including the width and height in luma samples, the color format, the luma bit depth, and the chroma bit depth.
  Whether the base layer picture is an instantaneous decoder refresh (IDR) picture or not.
  Optionally, whether the picture is a frame or a field, and when a field, the field parity (indicating whether the field is a top field or a bottom field). If not provided, the decoded picture is inferred to be a frame picture.
Output of base layer pictures is the responsibility of the base layer decoder. Optionally, only one non-base layer is present and it is the only target output layer.
The (multi-standard) SHVC decoder would only need to keep one decoded picture store of memory for a base layer decoded picture, and this memory is not considered as part of the DPB.
Association of a base layer decoded picture to an access unit is the responsibility of external system (e.g., the base layer decoder or other external means).
The nuh_layer_id of the base layer decoded picture is set equal to 0. Alternatively, the nuh_layer_id of the base layer decoded picture is set equal to the nuh_layer_id of the entry in the inter-layer reference picture set of an enhancement layer picture with the lowest value of nuh_layer_id among all the enhancement layer pictures in the access unit.
The picture order count of the base layer decoded picture is set equal to the picture order count of the enhancement layer pictures. Note that in this case the actual picture order count of a base layer picture decoded by the base layer decoder in such a scalable or multiview codec might be different than the picture order count value of the same picture when it is decoded by an AVC decoder.
The base layer decoded picture is marked as "used for long-term reference".
For the coded picture buffer operations of the hypothetical reference decoder or buffering model, the base layer is considered as having zero bits.
For decoded picture buffer operations of the hypothetical reference decoder or buffering model, only decoded pictures of enhancement layers are considered.

The second disclosure described the following improvements to the above design rules for video encoders and video decoders to support codec-hybrid multi-layer video coding.

When the base layer is non-HEVC, general_profile_space in the first profile_tier_level( ) syntax structure in a VPS is set equal to 1. In this case, the codec type is signaled, and when AVC is indicated, the three-byte AVC profile and level information is signaled, and the rest of the bits in the profile_tier_level( ) syntax structure are all reserved. Alternatively, the reserved bits are removed from the profile_tier_level( ) syntax structure when the base layer is AVC.
When the base layer is non-HEVC, it is required that the signaling of the three DPB parameters (max sub-DPB size, max reorder, and max latency) use the least amount of bits, and it is required that none of the hrd_parameters( ) syntax structures in the VPS applies to layer set 0 (the base layer only).

When the base layer is non-HEVC, unnecessary signaling for the base layer in the VPS extension, including VPS VUI, is avoided, e.g., sub_layers_vps_max_minus1[0], max_tid_il_ref_pics_plus1[0][j], and direct_dependency_type[i][0]. Alternatively, these syntax elements are still signalled but are constrained to be certain values, e.g., the value of direct_dependency_type[i][0] for any value i is required to be equal to 1.

For an access unit, the base layer decoded picture provided by the external system is stored in the sub-DPB for the base layer, and the size of that sub-DPB is set equal to 1, and the sub-DPB is emptied at the end of the decoding process for each access unit.

In addition to whether the base layer picture is an IRAP picture or not, when the picture is an IRAP picture, the external system is also required to provide the IRAP NAL unit type, which specifies an IDR picture, a CRA picture, or a BLA picture.

The value of the provided NAL unit type equal to IDR_W_RADL specifies that the decoded picture is an IDR picture and was decoded from a Rec. ITU-T H.264|ISO/IEC 14496-10 IDR picture.

The value of the provided NAL unit type equal to CRA_NUT specifies that the decoded picture is a CRA picture and was decoded from a Rec. ITU-T H.264|ISO/IEC 14496-10 coded picture that was associated with a Rec. ITU-T H.264|ISO/IEC 14496-10 recovery point SEI message with recovery_frame_cnt equal to 0 and broken_link_flag equal to 0.

The value of the provided NAL unit type equal to BLA_W_LP specifies that the decoded picture is a BLA picture and was decoded from a Rec. ITU-T H.264|ISO/IEC 14496-10 coded picture that was associated with a Rec. ITU-T H.264|ISO/IEC 14496-10 recovery point SEI message with recovery_frame_cnt equal to 0 and broken_link_flag equal to 1.

Alternatively, in addition to whether the base layer picture is an IRAP picture or not, when the picture is an IRAP picture, the external system is also required to provide the IRAP NAL unit type, which may be equal to one of all the specified IRAP NAL unit types specified in HEVC (i.e. IDR_W_RADL, IDR_N_LP, CRA_NUT, BLA_W_LP, BLA_W_RADL, BLA_N_LP). In addition to the above specifications for a selection among IDR_W_RADL, CRA_NUT, and BLA_W_LP, the presence of associated leading pictures (pictures subsequent in decoding order and preceding in output order) as well as the presence of associated non-decodable leading pictures in the base layer bitstream are also taken into account, similarly as for the rules for assignment of these NAL unit types in the HEVC spec.

The above described designs for video encoders and video decoders to support codec-hybrid multi-layer video coding may have some issues. As a first example issue, according to the above described designs, output of the base layer pictures is handled by the external system (e.g., the base layer video decoder), and whether the base layer or some of the base layer pictures should be output from the external system is determined by the enhancement layer decoder. The enhancement layer decoder determines whether the base layer should be output because, unlike the external system, the enhancement layer decoder knows from the bitstream whether the base layer is a target output layer or not. The enhancement layer decoder, however, lacks a means to convey such information from the enhancement layer decoder to the external system that controls the output of the base layer pictures.

As another example issue, according to the above described designs, it is unclear what kind of bitstreams are conforming bitstreams when the base layer is provided externally and potentially from a different codec than HEVC. In other words, the above described designs lack a specification of bitstream conformance for codec-hybrid multi-layer video coding. Consequently, it is unclear what kind of bitstreams an encoder should generate where the base layer is provided externally and potentially from a different codec than HEVC. As a further example issue, the above described designs lack a specification of decoder conformance for codec-hybrid multi-layer video coding. Consequently, it is unclear how to implement a decoder in order to deal with bitstreams where the base layer is provided externally and potentially from a different codec than HEVC in a way that is compliant with the HEVC standard.

The techniques of this disclosure are directed toward signaling output indications in codec-hybrid multi-layer video coding. Specifically, the techniques enable an enhancement layer decoder to send a message to an external system (e.g., a base layer decoder or a control system for a base layer decoder) indicating whether the base layer needs to be output for display. In this way, the output indications can be conveyed from the enhancement layer decoder to the external system that controls the output of the base layer decoded pictures of the base layer.

In one example, the enhancement layer decoder signals a flag, e.g., BaseLayerOutputFlag, to the external system indicating whether or not the base layer is identified as a target output layer to be output for display. As an example, BaseLayerOutputFlag=1 may indicate that the base layer is a target output layer, and BaseLayerOutputFlag=0 may indicate that the base layer is not a target output layer. In another example, the enhancement layer decoder signals a flag, e.g., BaseLayerPicOutputFlag, for each base layer decoded picture of the base layer to the external system indicating whether or not a respective base layer decoded picture is to be output for display. As an example, BaseLayerPicOutputFlag=1 for a given access unit may indicate that the base layer picture of the access unit is to be output for display, and BaseLayerPicOutputFlag=0 for a given access unit may indicate that the base layer picture of the access unit is not output.

In some cases, the flag, e.g., BaseLayerPicOutputFlag, for each base layer decoded picture of the base layer may only be signaled when the base layer is not a target output layer, e.g., BaseLayerOutputFlag=0. In this way, the disclosed techniques enable output indication signaling for specific base layer decoded pictures of the base layer even though the entire base layer is not to be output for display. In one example, a specific base layer decoded picture of the base layer, which is not a target output layer, may need to be output for display when the base layer is a direct or indirect reference layer of a target output layer, the access unit that includes the base layer picture does not include a picture at the target output layer, and the access unit that includes the base layer picture does not include a picture at any other direct or indirect reference layer of the target output layer. In this case, the techniques enable the enhancement layer decoder to signal the flag, e.g., BaseLayerPicOutputFlag=1, for the specific base layer decoded picture of the base layer indicating that the specific base layer decoded picture needs to be output for display.

In addition, this disclosure specifies bitstream conformance and decoder conformance for codec-hybrid multi-layer video coding where the base layer is provided externally and potentially from a different video codec standard than HEVC. According to the techniques described in this disclosure, when the base layer is provided by the external system, a video encoder generates conforming bitstreams that include enhancement layer encoded pictures that belong to at least one enhancement layer, without including any base layer encoded pictures that belong to the base layer. According to the disclosed techniques, when the base layer is provided by the external system, a conforming video decoder decodes conforming bitstreams, outputs enhancement layer decoded pictures that belong to an enhancement layer identified as a target output layer, and sends the output indication for the base layer to the external system.

As one example, the decoding process for an enhancement layer decoder to signal output indications to an external system indicating whether a base layer or specific base layer decoded pictures need to be output may be specified as follows, with the following text being added to the text in Section F.8.1 General decoding process of SHVC WD5, cited above.

In addition to a list of decoded pictures, this process also outputs a flag BaseLayerOutputFlag, and, when BaseLayerOutputFlag is equal to 0 and AltOptLayerFlag[TargetOptLayerSetIdx] is equal to 1, a flag BaseLayerPicOutputFlag for each access unit.

NOTE—The BaseLayerOutputFlag and, when present, BaseLayerPicOutputFlag for each access unit, are to be sent by an external means to the base layer decoder for controlling the output of base layer decoded pictures.

The following applies:
BaseLayerOutputFlag is derived as follows:
BaseLayerOutputFlag=(TargetOptLayerIdList[0]==0)
BaseLayerOutputFlag equal to 1 specifies that the base layer is a target output layer. BaseLayerOutputFlag equal to 0 specifies that the base layer is a not target output layer.

When BaseLayerOutputFlag is equal to 0 and AltOptLayerFlag[TargetOptLayerSetIdx] is equal to 1, for each access unit, BaseLayerPicOutputFlag is derived as follows:

if (the base layer is a direct or indirect reference layer of the target output layer, the access unit does not contain a picture at the target output layer and does not contain a picture at any other direct or indirect reference layer of the target output layer)
BaseLayerPicOutputFlag=1
else
BaseLayerPicOutputFlag=0
BaseLayerPicOutputFlag equal to 1 for an access unit specifies that the base layer picture of the access unit is output. BaseLayerPicOutputFlag equal to 0 for an access unit specifies that the base layer picture of the access unit is not output.

As another example, bitstream conformance may be specified as follows, with the italicized text being added to the text in Section C.4 Bitstream conformance of SHVC WD5, cited above. Other aspects of the codec design are basically the same as described in the second disclosure, cited above.

C.4 Bitstream Conformance

A bitstream of coded data conforming to this Specification shall fulfil all requirements specified in this subclause.

The bitstream shall be constructed according to the syntax, semantics, and constraints specified in this Specification outside of this annex.

The first access unit in a bitstream shall be an IRAP access unit.

The bitstream is tested by the HRD for conformance as specified in subclause C.1 of the HEVC spec.

*When vps_base_layer_external_flag is equal to 1, all the following bitstream conformance constraints apply without considering pictures with nuh_layer_id equal to 0, for which there is no coded picture in the bitstream and the decoded pictures are provided by external system.*

Let currPicLayerId be equal to the nuh_layer_id of the current picture.

For each current picture, let the variables maxPicOrderCnt and minPicOrderCnt be set equal to the maximum and the minimum, respectively, of the PicOrderCntVal values of the following pictures with nuh_layer_id equal to currPicLayerId:

The current picture.

The previous picture in decoding order that has TemporalId equal to 0 and that is not a RASL picture, a RADL picture, or a sub-layer non-reference picture.

The short-term reference pictures in the RPS of the current picture.

All pictures n that have PicOutputFlag equal to 1, AuCpbRemovalTime[n] less than AuCpbRemovalTime[currPic], and DpbOutputTime[n] greater than or equal to AuCpbRemovalTime[currPic], where currPic is the current picture.

All of the following conditions shall be fulfilled for each of the bitstream conformance tests:

1. For each access unit n, with n greater than 0, associated with a buffering period SEI message, let the variable deltaTime90 k[n] be specified as follows:

deltaTime90k[n]=90000*(AuNominalRemovalTime[n]−AuFinalArrivalTime[n−1])

The value of InitCpbRemovalDelay[SchedSelIdx] is constrained as follows:

If cbr_flag[SchedSelIdx] is equal to 0, the following condition shall be true:
InitCpbRemovalDelay[SchedSelIdx]<=Ceil(deltaTime90 k[n])
Otherwise (cbr_flag[SchedSelIdx] is equal to 1), the following condition shall be true:
Floor(deltaTime90 k[n])<=InitCpbRemovalDelay[SchedSelIdx]<=Ceil(deltaTime90 k[n])

NOTE 1—The exact number of bits in the CPB at the removal time of each picture may depend on which buffering period SEI message is selected to initialize the HRD. Encoders must take this into account to ensure that all specified constraints must be obeyed regardless of which buffering period SEI message is selected to initialize the HRD, as the HRD may be initialized at any one of the buffering period SEI messages.

2. A CPB overflow is specified as the condition in which the total number of bits in the CPB is greater than the CPB size. The CPB shall never overflow.

3. A CPB underflow is specified as the condition in which the nominal CPB removal time of decoding unit (DU) m DuNominalRemovalTime(m) is less than the final CPB arrival time of decoding unit m DuFinalArrivalTime(m) for at least one value of m. When low_delay_hrd_flag[HighestTid] is equal to 0, the CPB shall never underflow.

4. When SubPicHrdFlag is equal to 1, low_delay_hrd_flag[HighestTid] is equal to 1, and the nominal removal time of a decoding unit m of access unit n is less than the final CPB arrival time of decoding unit m (i.e. DuNominalRemovalTime[m]<DuFinalArrivalTime[m]), the nominal removal time of access unit n shall be less than the final CPB arrival time of access unit n (i.e. AuNominalRemovalTime[n]<AuFinalArrivalTime[n]).
5. When the bitstream-partition-specific CPB operation is used and cbr_flag[SchedSelIdx] is equal to 1, DuCpbRemovalTime[m] shall be greater than or equal to the CPB removal time of the previous DU preceding the current DU in decoding order (regardless of the bitstream partitions to which the previous DU and the current DU belong) for any decoding unit m in bitstream partitions with index greater than 0.
6. The nominal removal times of access units from the CPB (starting from the second access unit in decoding order) shall satisfy the constraints on AuNominalRemovalTime[n] and AuCpbRemovalTime[n] expressed in subclauses A.4.1 through A.4.2.
7. For each current picture, after invocation of the process for removal of pictures from the sub-DPB as specified in subclause C.3.2 of the HEVC spec, the number of decoded pictures in the sub-DPB for the current layer, including all pictures n in the current layer that are marked as "used for reference," or that have PicOutputFlag equal to 1 and AuCpbRemovalTime[n] less than AuCpbRemovalTime[currPic], where currPic is the current picture, shall be less than or equal to sps_max_dec_pic_buffering_minus1 [HighestTid] when currPicLayerId is equal to 0 or max_vps_dec_pic_buffering_minus1 [TargetOutputLayerSetIdx][subDpbIdx][HighestTid] when currPicLayerId is greater than 0, where the variable subDpbIdx is equal to SubDpbAssigned[LayerSetIdxForOutputLayerSet[TargetOptLayerSetIdx]][layerIdx] and LayerSetLayerIdList[lsIdx][layerIdx] is equal to currPicLayerId.
8. All reference pictures shall be present in the DPB when needed for prediction. Each picture that has PicOutputFlag equal to 1 shall be present in the DPB at its DPB output time unless it is removed from the DPB before its output time by one of the processes specified in subclause C.3 of the HEVC spec.
9. For each current picture, the value of maxPicOrderCnt−minPicOrderCnt shall be less than MaxPicOrderCntLsb/2.
10. The value of DpbOutputInterval[n] as given by Equation C-18 of the HEVC spec, which is the difference between the output time of an access unit and that of the first access unit following it in output order and having PicOutputFlag equal to 1, shall satisfy the constraint expressed in subclause A.4.1 for the profile, tier and level specified in the bitstream using the decoding process specified in clauses 2 through 10.
11. For each current picture, when sub_pic_cpb_params_in_pic_timing_sei_flag is equal to 1, let tmpCpbRemovalDelaySum be derived as follows:
tmpCpbRemovalDelaySum=0
for (i=0; i<num_decoding_units_minus1; i++)
tmpCpbRemovalDelaySum+=du_cpb_removal_delay_increment_minus1 [i]+1 The value of ClockSubTick*tmpCpbRemovalDelaySum shall be equal to the difference between the nominal CPB removal time of the current access unit and the nominal CPB removal time of the first decoding unit in the current access unit in decoding order.
12. For any two pictures m and n in the same CVS, when DpbOutputTime[m] is greater than DpbOutputTime[n], the PicOrderCntVal of picture m shall be greater than the PicOrderCntVal of picture n.
NOTE 2—All pictures of an earlier CVS in decoding order that are output are output before any pictures of a later CVS in decoding order. Within any particular CVS, the pictures that are output are output in increasing PicOrderCntVal order.

As another example, decoder conformance may be specified as follows, with the italicized text being added to the text in Section C.5 Decoder conformance in SHVC WD5, cited above. Other aspects of the codec design are basically the same as described in the second disclosure described above. According to the techniques of this disclosure, as part of the decoder conformance definition, a conforming decoder signals an output indication to an external system indicating whether the base layer needs to be output for display. In one example, the conforming decoder signals an output indication to the external system indicating whether or not the base layer is identified as a target output layer to be output for display. In another example, the conforming decoder signals output indications to the external system indicating whether or not individual base layer decoded pictures are to be output for display. The output indications generated by the conforming decoder are in addition to the output of other information already specified, e.g., enhancement layer decoded pictures that belong to target output layers and that are indicated to be output by the conforming decoder.

C.5 Decoder Conformance

C.5.1 General

A decoder conforming to this Specification shall fulfil all requirements specified in this subclause.

A decoder claiming conformance to a specific profile, tier and level shall be able to successfully decode all bitstreams that conform to the bitstream conformance requirements specified in subclause C.4 of the HEVC spec, in the manner specified in Annex A, provided that all VPSs, SPSs and PPSs referred to by the VCL NAL units, appropriate buffering period, picture timing, and decoding unit information SEI messages are conveyed to the decoder in a timely manner, either in the bitstream (by non-VCL NAL units), or by an external system not specified in this Specification, and, when vps_base_layer_external_flag is equal to 1, the decoded pictures with nuh_layer_id equal to 0 and their properties as described in subclause F.8.1 are conveyed to the decoder in a timely manner by an external system not specified in this Specification.

When a bitstream contains syntax elements that have values that are specified as reserved and it is specified that decoders shall ignore values of the syntax elements or NAL units containing the syntax elements having the reserved values, and the bitstream is otherwise conforming to this Specification, a conforming decoder shall decode the bitstream in the same manner as it would decode a conforming bitstream and shall ignore the syntax elements or the NAL units containing the syntax elements having the reserved values as specified.

There are two types of conformance that can be claimed by a decoder: output timing conformance and output order conformance.

To check conformance of a decoder, test bitstreams conforming to the claimed profile, tier and level, as specified in subclause C.4 of the HEVC spec are delivered by a hypothetical stream scheduler (HSS) both to the HRD and to the decoder under test (DUT). When vps_base_layer_external_flag is equal to 1, decoded pictures with nuh_layer_id equal to 0 and their properties as described in subclause F.8.1 are also conveyed both to the HRD and to the DUT in a timely manner by external system not specified in this Specification. All cropped decoded pictures output by the HRD shall also be output by the DUT, each cropped decoded picture output by the DUT shall be a picture with PicOutputFlag equal to 1, and, for each such cropped decoded picture output by the DUT, the values of all samples that are output shall be equal to the values of the samples produced by the specified decoding process. The flag BaseLayerOutputFlag and all flags BaseLayerPicOutputFlag output by the HRD shall also be output by the DUT, and the values that are output shall be equal to the values produced by the specified decoding process.

For output timing decoder conformance, the HSS operates as described above, with delivery schedules selected only from the subset of values of SchedSelIdx for which the bit rate and CPB size are restricted as specified in Annex A for the specified profile, tier and level, or with "interpolated" delivery schedules as specified below for which the bit rate and CPB size are restricted as specified in Annex A. The same delivery schedule is used for both the HRD and the DUT.

When the HRD parameters and the buffering period SEI messages are present with cpb_cnt_minus [HighestTid] greater than 0, the decoder shall be capable of decoding the bitstream as delivered from the HSS operating using an "interpolated" delivery schedule specified as having peak bit rate r, CPB size c(r), and initial CPB removal delay (f(r)÷r) as follows:

$$\alpha = (r - \text{BitRate}[\text{SchedSelIdx}-1]) \div (\text{BitRate}[\text{SchedSelIdx}] - \text{BitRate}[\text{SchedSelIdx}-1])$$

$$c(r) = \alpha * Cpb\text{Size}[\text{SchedSelIdx}] + (1-\alpha) * Cpb\text{Size}[\text{SchedSelIdx}-1]$$

$$f(r) = \alpha * \text{Init}Cpb\text{RemovalDelay}[\text{SchedSelIdx}] * \text{BitRate}[\text{SchedSelIdx}] + (1-\alpha) * \text{Init}Cpb\text{RemovalDelay}[\text{SchedSelIdx}-1] * \text{BitRate}[\text{SchedSelIdx}-1]$$

for any SchedSelIdx>0 and r such that BitRate[SchedSelIdx−1]<=r<=BitRate[SchedSelIdx], such that r and c(r) are within the limits as specified in Annex A for the maximum bit rate and buffer size for the specified profile, tier and level. NOTE 1—InitCpbRemovalDelay[SchedSelIdx] can be different from one buffering period to another and need to be recalculated.

For output timing decoder conformance, an HRD as described above is used and the timing (relative to the delivery time of the first bit) of picture output is the same for both the HRD and the DUT up to a fixed delay.

For output order decoder conformance, the following applies:

The HSS delivers the bitstream BitstreamToDecode to the DUT "by demand" from the DUT, meaning that the HSS delivers bits (in decoding order) only when the DUT requires more bits to proceed with its processing. NOTE 2—This means that for this test, the coded picture buffer of the DUT could be as small as the size of the largest decoding unit.

A modified HRD as described below is used, and the HSS delivers the bitstream to the HRD by one of the schedules specified in the bitstream BitstreamToDecode such that the bit rate and CPB size are restricted as specified in Annex A. The order of pictures output shall be the same for both the HRD and the DUT.

The HRD CPB size is given by CpbSize[SchedSelIdx] as specified in subclause E.3.3 of the HEVC spec, where SchedSelIdx and the HRD parameters are selected as specified in subclause C.1 of the HEVC spec. The DPB size is given by sps_max_dec_pic_buffering_minus [HighestTid]+1. Removal time from the CPB for the HRD is the final bit arrival time and decoding is immediate. The operation of the DPB of this HRD is as described in subclauses C.5.2 through C.5.2.3 of the HEVC spec.

Figure 2:
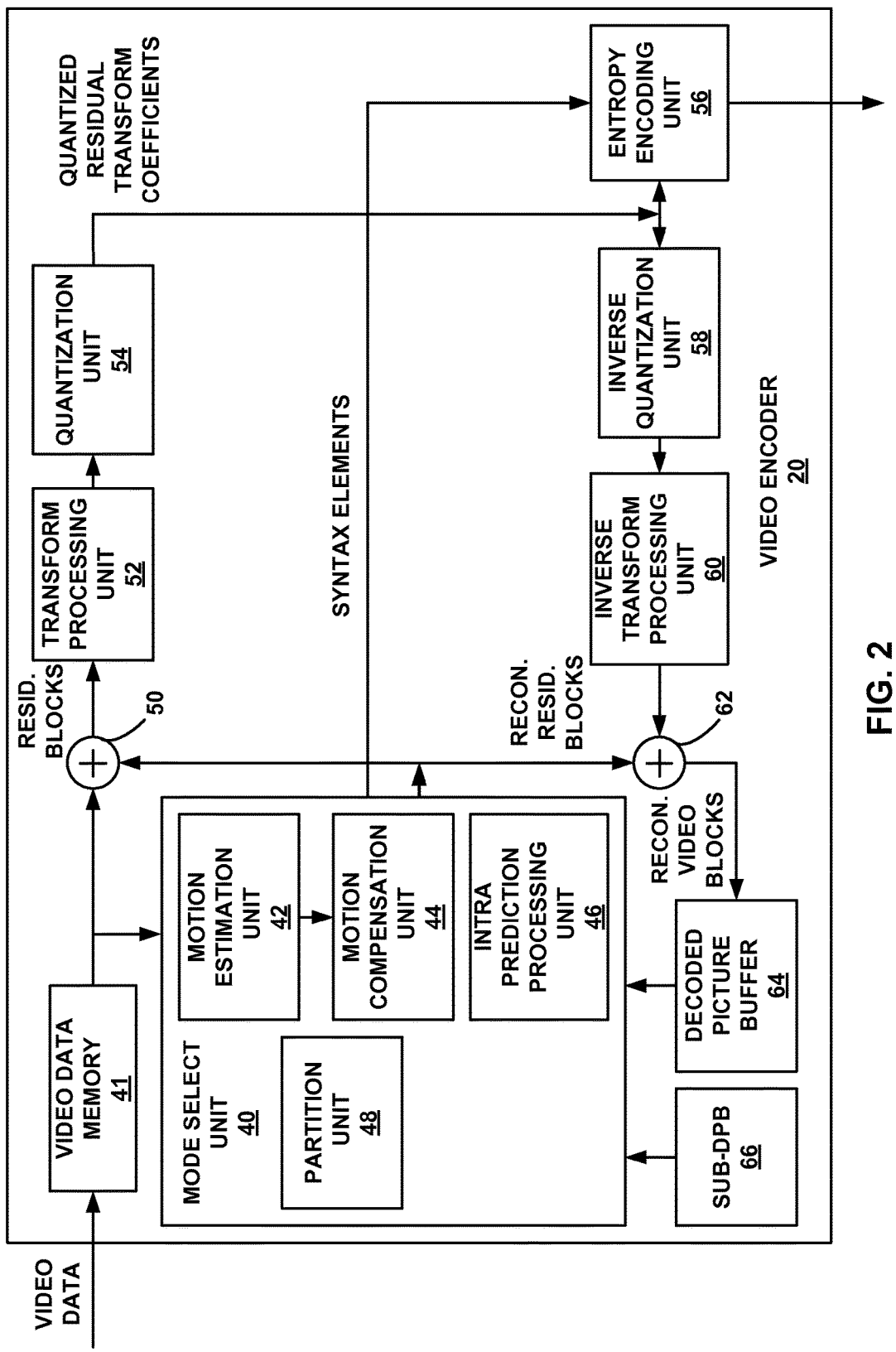
FIG. 2 is a block diagram illustrating an example of a video encoder that may implement techniques for generating conforming bitstreams in codec-hybrid multi-layer video coding.

FIG. 2 is a block diagram illustrating an example of video encoder 20 that may implement techniques for generating conforming bitstreams in codec-hybrid multi-layer video coding. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (1 mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, a video data memory 41, decoded picture buffer 64, summer 50, transform processing unit 52, quantization unit 54, and entropy encoding unit 56. Mode select unit 40, in turn, includes motion compensation unit 44, motion estimation unit 42, intra prediction processing unit 46, and partition unit 48. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 41 may store video data to be encoded by the components of video encoder 20. The video data stored in video data memory 41 may be obtained, for example, from video source 18. Decoded picture buffer 64 may be a reference picture memory that stores reference video data for use in encoding video data by video encoder 20, e.g., in intra- or inter-coding modes. Sub-decoded picture buffer (DPB) 66 may be a reference picture memory that stores decoded pictures of a lower (i.e., base) layer of video data for use in generating inter-layer or inter-view reference pictures used by video encoder 20 to encode video data of a higher (i.e., enhancement) layer of the video data. Video data memory 41. DPB 64, and sub-DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41, decoded picture buffer 64, and sub-DPB 66 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra prediction processing unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current picture (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may intra-predict a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

For example, intra prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra-prediction mode exhibits the best rate-distortion value for the block.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54.

Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of decoded picture buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in decoded picture buffer 64. The reconstructed video block may be used by motion estimation unit 42 and motion compensation unit 44 as a reference block to inter-code a block in a subsequent video frame.

According to the techniques described in this disclosure, video encoder 20 may operate as an enhancement layer video encoder that encodes one or more enhancement layers of video data in accordance with any of the SHVC extension, the MV-HEVC extension, the 3D-HEVC extension, or other multi-layer video coding extensions to HEVC. In the case of codec-hybrid multi-layer video coding, base layer decoded pictures of a base layer of the video data are provided by an external system, such as a base layer video decoder, a base layer video encoder, a control system of a base layer video decoder, or a control system for the base layer video encoder. In some examples, the base layer may be coded according to a first video codec standard (e.g., H.264/AVC) and the enhancement layers of the video data may be coded according to a different, second video codec standard (e.g., one of the multi-layer extensions of H.265/HEVC). In the example where the base layer conforms to the AVC standard, the external system may be a base layer video decoder configured to decode video data according to the AVC standard.

Video encoder 20 may generate inter-layer reference pictures from base layer decoded pictures of the base layer for use in predicting video blocks in a current picture of one of the enhancement layers. Video encoder 20 may receive the base layer decoded pictures from the external system, and store the base layer decoded pictures in sub-DPB 66. The base layer decoded pictures stored in sub-DPB 66 of video encoder 20 may be up-sampled from a base layer resolution to have the same resolution as the one of the enhancement layers being encoded by video encoder 20. In general, video encoder 20 may perform inter-layer prediction in a similar manner as inter prediction described above, except one or more up-sampled base layer decoded pictures stored in sub-DPB 66 may be used as reference pictures as opposed to one or more neighboring enhancement layer decoded pictures stored in decoded picture buffer 64.

Sub-DPB 66 may be considered a separate memory space and not as part of decoded picture buffer 64. In some examples, the base layer decoded pictures in sub-DPB 66 may be marked as long-term reference pictures. In other examples, for a given access unit that includes coded pictures or slices at the same time instance across multiple layers, the size of sub-DPB 66 may be set equal to 1 such that sub-DPB 66 only holds one base layer decoded picture for the given access unit and sub-DPB 66 is emptied at the end of the encoding process for the given access unit.

The techniques of this disclosure relate to encoding a conforming bitstream for codec-hybrid multi-layer video coding. When a base layer of video data is provided by an external system, the bitstream conformance constraints for codec-hybrid multi-layer video coding may be the same as in SHVC WD5, for example, but without consideration of pictures that belong to the base layer, e.g., pictures with nuh_layer_id equal to 0. In this case, no base layer encoded pictures are included in the bitstream and base layer decoded pictures are provided by the external system. According to the disclosed techniques, the bitstream generated by video encoder 20 comprises a conforming bitstream if the bitstream includes enhancement layer encoded pictures that belong to one or more enhancement layers of the video data, without including any base layer encoded pictures that belong to the base layer. The bitstream may be checked for conformance by a hypothetical reference decoder (HRD).

Figure 3:
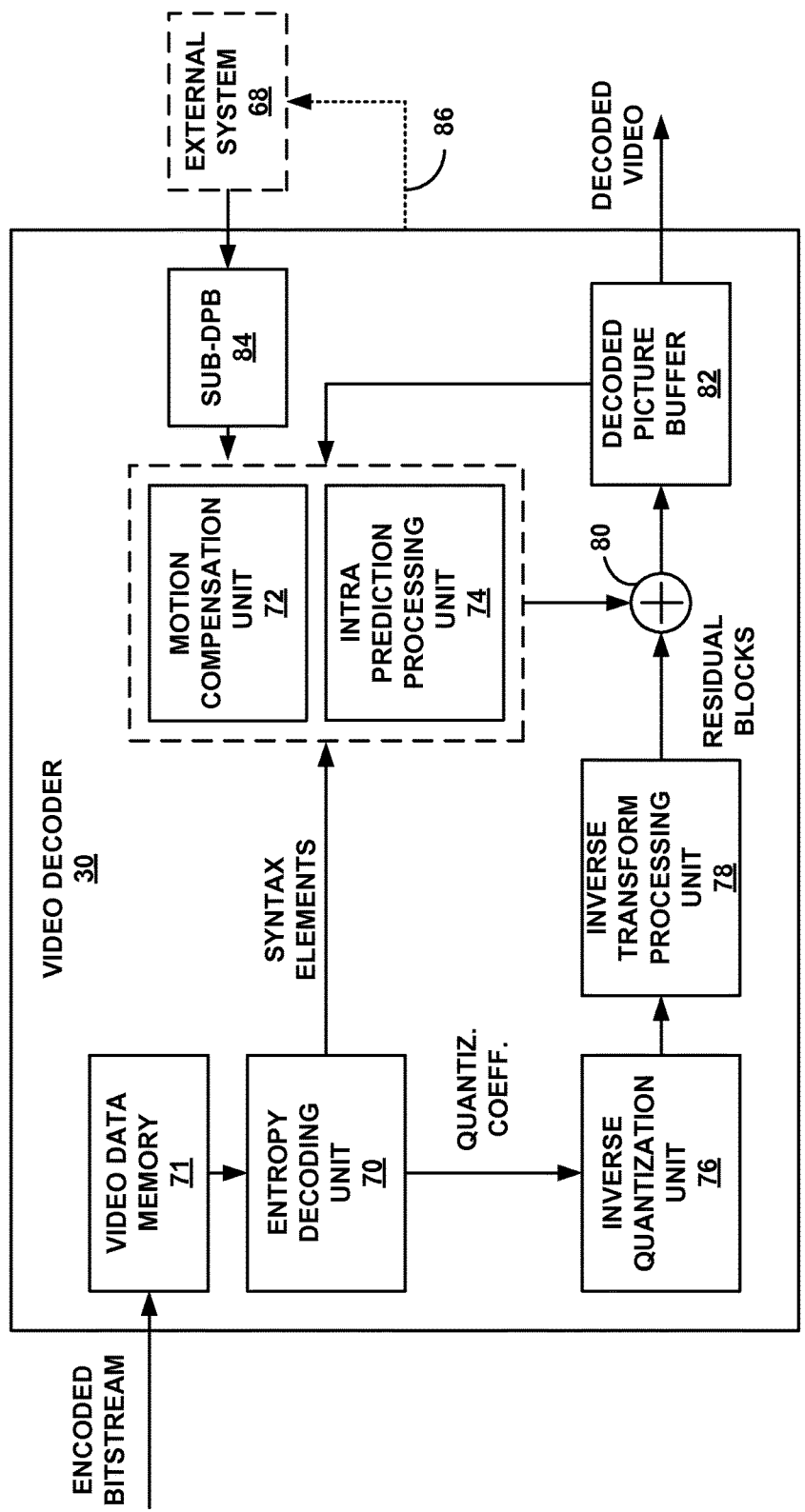
FIG. 3 is a block diagram illustrating an example of a video decoder that may implement techniques for decoding conforming bitstreams and signaling output indications in codec-hybrid multi-layer video coding.

FIG. 3 is a block diagram illustrating an example of video decoder 30 that may implement techniques for decoding conforming bitstreams and signaling output indications in codec-hybrid multi-layer video coding. In the example of FIG. 3, video decoder 30 includes an entropy decoding unit 70, a video data memory 71, motion compensation unit 72, intra prediction processing unit 74, inverse quantization unit 76, inverse transform processing unit 78, decoded picture buffer 82 and summer 80. Video decoder 30 may, in some examples, perform a decoding pass generally reciprocal to the encoding pass described with respect to video encoder 20 from FIG. 2.

Video data memory 71 may store video data, such as an encoded video bitstream, to be decoded by the components of video decoder 30. The video data stored in video data memory 71 may be obtained, for example, from computer-readable medium 16, e.g., from a local video source, such as a camera, via wired or wireless network communication of video data, or by accessing physical data storage media. Video data memory 71 may form a coded picture buffer (CPB) that stores encoded video data from an encoded video bitstream. Decoded picture buffer 82 may be a reference picture memory that stores reference video data for use in decoding video data by video decoder 30, e.g., in intra- or inter-coding modes. Sub-decoded picture buffer (DPB) 84 may be a reference picture memory that stores decoded pictures of a lower (i.e., base) layer of video data for use in generating inter-layer or inter-view reference pictures used by video decoder 30 to decode video data of a higher (i.e., enhancement) layer of the video data.

Video data memory 71, decoded picture buffer 82, and sub-DPB 84 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 71, decoded picture buffer 82, and sub-DPB 84 may be provided by the same memory device or separate memory devices. In various examples, video data memory 71 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (1) slice, intra prediction processing unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in decoded picture buffer 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

According to the techniques described in this disclosure, video decoder 30 may operate as an enhancement layer video decoder that decodes one or more enhancement layers of video data included in a received bitstream in accordance with any of the SHVC extension, the MV-HEVC extension, the 3D-HEVC extension, or other multi-layer video coding extensions to HEVC. In the case of codec-hybrid multi-layer video coding, base layer decoded pictures of a base layer of the video data are provided by an external system 68. In some examples, the base layer may be coded according to a first video codec standard (e.g., H.264/AVC) and the enhancement layers of the video data may be coded according to a different, second video codec standard (e.g., one of the multi-layer extensions of H.265/HEVC).

External system 68 may be, for example, a base layer video decoder such as base layer decoder 130 described with respect to FIG. 5 below. In other examples, external system 68 may be a control system for a base layer video decoder such as a server, a media-aware network element (MANE), a video editor/splicer, or other such device. In the example where the base layer conforms to the AVC standard, external system 68 may be a base layer video decoder or a control system for a base layer video decoder configured to decode video data according to the AVC standard. In some cases, external system 68 and video decoder 30 may be included within the same multi-layer video decoder such as multi-layer video decoder 120 described with respect to FIG. 5 below.

Video decoder 30 may generate inter-layer reference pictures from base layer decoded pictures of the base layer for use in predicting video blocks to reconstruct a current picture of one of the enhancement layers included in the received bitstream. Video decoder 30 may receive the base layer decoded pictures from external system 68, and store the base layer decoded pictures in sub-DPB 84. The base layer decoded pictures stored in sub-DPB 84 of video decoder 30 may be up-sampled from a base layer resolution to have the same resolution as the one of the enhancement layers being decoded by video decoder 30. In general, video decoder 30 may perform inter-layer prediction in a similar manner as inter prediction described above, except one or more up-sampled base layer decoded pictures stored in sub-DPB 84 may be used as reference pictures as opposed to one or more neighboring enhancement layer decoded pictures stored in decoded picture buffer 82.

Sub-DPB 84 may be considered a separate memory space and not as part of decoded picture buffer 82. In some examples, the base layer decoded pictures in sub-DPB 84 may be marked as long-term reference pictures. In other examples, for a given access unit that includes coded pictures or slices at the same time instance across multiple layers, the size of sub-DPB 84 may be set equal to 1 such that sub-DPB 84 only holds one base layer decoded picture for the given access unit and sub-DPB 84 is emptied at the end of the decoding process for the given access unit.

The techniques of this disclosure relate to signaling output indications for codec-hybrid multi-layer video coding. In accordance with the techniques, video decoder 30 receives an enhancement layer bitstream that includes at least one enhancement layer of video data to be decoded, an indication that the base layer is provided externally, and an indication of which layers are target output layers to be output for display. In some examples, video decoder 30 may receive a syntax element, e.g., vps_base_layer_external_flag, in the enhancement layer bitstream indicating that the base layer is provided by external system 68. In addition, video decoder 30 may receive one or more syntax elements, e.g., output_layer_flag, in the enhancement layer bitstream indicating whether each layer of the video data is a target output layer to be output for display. If the at least one enhancement layer in the enhancement layer bitstream is identified as one of the target output layers, video decoder 30 outputs enhancement layer decoded pictures of the at least one enhancement layer for display.

Unlike video decoder 30, external system 68 does not receive an indication of the target output layers in a base layer bitstream. External system 68, therefore, does not know which layers are target output layers and, more importantly, does not know whether the base layer should be output for display or whether specific base layer decoded pictures of the base layer should be output for display. The disclosed techniques enable video decoder 30 to send an output indication 86 to external system 68 indicating whether the base layer or specific base layer decoded pictures need to be output for display.

In one example, when the base layer is provided by external system 68, video decoder 30 signals a flag, e.g., BaseLayerOutputFlag, as output indication 86 to external system 68 indicating whether or not the base layer is identified as a target output layer to be output for display. In another example, when the base layer is provided by external system 68, video decoder 30 signals a flag, e.g., BaseLayerPicOutputFlag, as output indication 86 for each base layer decoded picture of the base layer to external system 68 indicating whether or not a respective base layer decoded picture is to be output for display. In some cases, video decoder 30 only signals the flag. e.g., BaseLayerPicOutputFlag, for each base layer decoded picture of the base layer when the base layer is not a target output layer, e.g., BaseLayerOutputFlag=0. In this way, video decoder 30 may indicate whether to output a specific base layer decoded picture of the base layer even though the entire base layer is not to be output for display.

The techniques of this disclosure also relate to decoding conforming bitstreams for codec-hybrid multi-layer video coding. When video decoder 30 is a conforming decoder for codec-hybrid multi-layer video coding, video decoder 30 is capable of decoding a conforming bitstream for codec-hybrid multi-layer video coding, specified in this disclosure as including enhancement layer encoded pictures that belong to an enhancement layer, without including any base layer encoded pictures that belong to a base layer. When the base layer of the video data is provided by external system 68, the decoder conformance constraints may be the same as in SHVC WD5, for example, but further require the receipt of base layer decoded pictures from external system 68 and the signaling of output indication 86 for the base layer to external system 68. According to the disclosed techniques, video decoder 30 comprises a conforming decoder if video decoder 30 outputs the enhancement layer decoded pictures of the enhancement layer identified as one of the target output layers and sends output indication 86 for the base layer to external system 68. Video decoder 30 may be checked for conformance by comparing output of test conforming bitstreams from a hypothetical reference decoder (HRD) and the decoder under test (DUT), i.e., video decoder 30.

Figure 4:
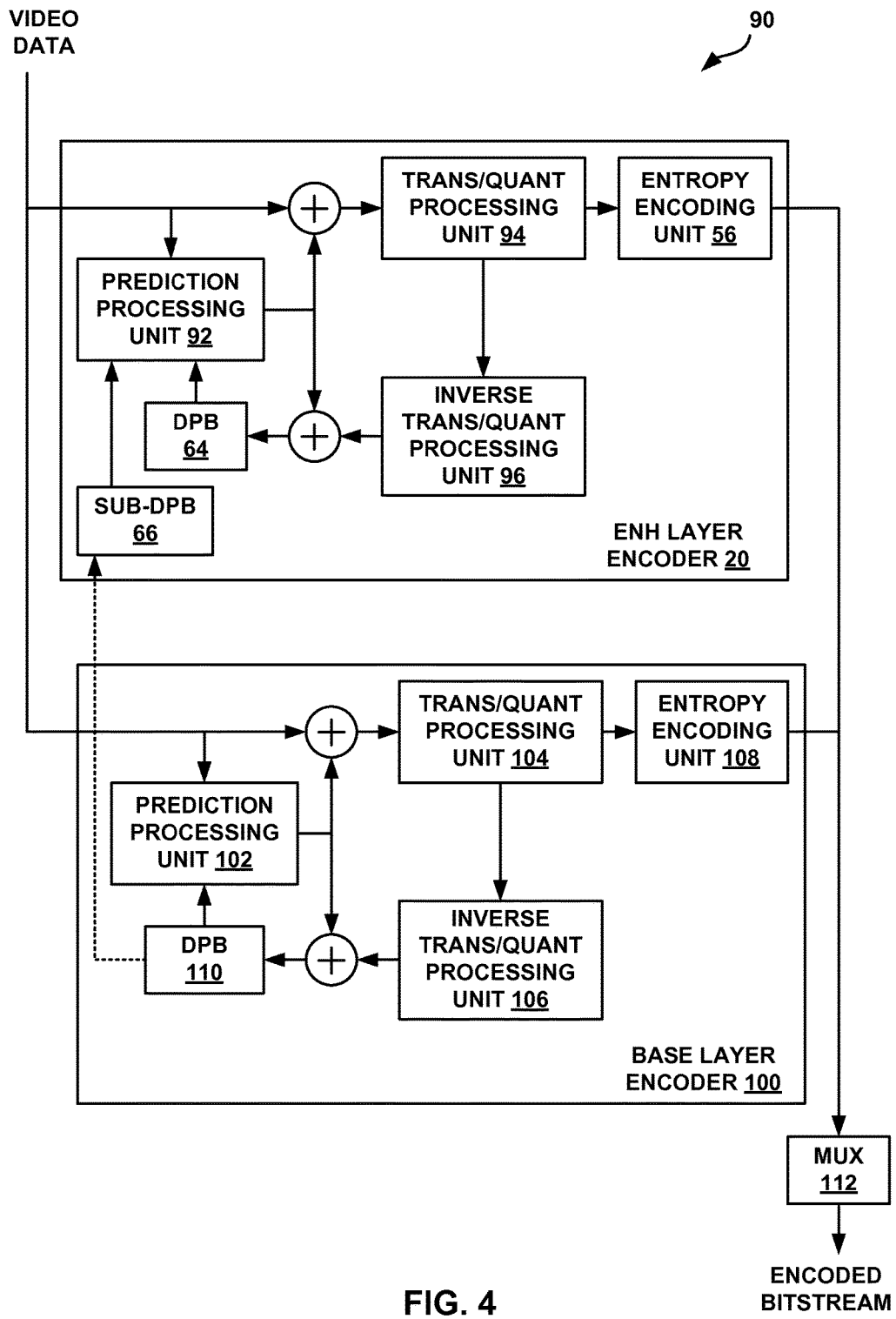
FIG. 4 is a block diagram illustrating an example multi-layer video encoder that may support codec-hybrid multi-layer video encoding in accordance with the techniques of this disclosure.

FIG. 4 is a block diagram illustrating an example multi-layer video encoder 90 that may support codec-hybrid multi-layer video encoding in accordance with the techniques of this disclosure. Multi-layer video encoder 90 includes a base layer encoder 100 and video encoder 20 from FIG. 2 operating as an enhancement layer encoder. Base layer encoder 100 may be configured to encode video data according to a first video codec standard, such as the H.264/AVC standard. Enhancement layer encoder 20 may be configured to encode video data according to a different, second video codec standard, such as the H.265/HEVC standard or one of the multi-layer extensions of HEVC. According to the disclosed techniques, enhancement layer encoder 20 may be further configured to generate conforming bitstreams in codec-hybrid multi-layer video coding.

Enhancement layer encoder 20 may operate as described in FIG. 2 above. Some of the components illustrated in FIG. 2 have been condensed for illustration purposes. For example, prediction processing unit 92 may operate as mode select unit 40 and the components within mode select unit 40 from FIG. 2. Transform/quantization processing unit 94 may operate as transform processing unit 52 and quantization unit 54 from FIG. 2. Inverse transform/quantization unit 96 may operate as inverse quantization unit 58 and inverse transform processing unit 60 from FIG. 2.

Base layer encoder 100 may perform intra- and inter-coding of video blocks within pictures of a base layer of video data in order to generate a base layer bitstream. Base layer encoder 100 may encode the video blocks in a similar manner as described above with respect to video encoder 20 of FIG. 2. For example, base layer encoder 100 receives a current video block within a base layer picture to be encoded. In some examples, the base layer picture may be a down-sampled version of a picture of the video data in order to have a resolution that is encodable by base layer encoder 100

In the example of FIG. 4, base layer encoder 100 includes a prediction processing unit 102, a transform/quantization processing unit 104, an inverse transform/quantization processing unit 106, an entropy encoding unit 108, and a decoded picture buffer (DPB) 110. Although not shown for brevity, base layer encoder 100 may also include one or more filters that filter base layer decoded pictures stored in DPB 110.

Prediction processing unit 102 may be similar to mode select unit 40 and the components within mode select unit 40 of video encoder 20 from FIG. 2. Prediction processing unit 102 performs either inter-predictive coding of the current video block relative to one or more blocks in one or more reference pictures in DPB 110 to provide temporal prediction, or alternatively performs intra-predictive coding of the current video block relative to one or more neighboring blocks in the same picture or slice as the current video block to provide spatial prediction. Prediction processing unit 102 may select one of the coding modes, intra or inter, e.g., based on error results, and provide the resulting intra- or inter-coded block to generate residual block data and to reconstruct the encoded block for use as a reference picture.

Transform/quantization processing unit 104 may be similar to transform processing unit 52 and quantization unit 54 of video encoder 20 from FIG. 2. Transform/quantization processing unit 104 applies a transform to the residual block, producing a video block comprising residual transform coefficient values, and then quantizes the transform coefficients to further reduce bit rate. Following transform and quantization, entropy encoding unit 108 entropy codes the quantized transform coefficients. Entropy encoding unit 108 may be similar to entropy encoding unit 56 of video encoder 20 from FIG. 2. Following the entropy coding by entropy encoding unit 108, the encoded base layer bitstream may be transmitted to another device (e.g., external system 68 of FIG. 3 or base layer decoder 130 of FIG. 5) or archived for later transmission or retrieval.

Inverse transform/quantization unit 106 may be similar to inverse quantization unit 58 and inverse transform processing unit 60 of video encoder 20 from FIG. 2. Inverse transform/quantization unit 106 applies inverse quantization and inverse transformation to reconstruct the residual block. The reconstructed residual block is added to a predictive block to produce a reconstructed video block of a base layer decoded picture stored in DPB 110 for later use as a reference picture. The base layer decoded picture may be used by prediction processing unit 102 as a reference picture to inter-code a block in a subsequent picture.

According to the disclosed techniques, the base layer decoded picture may also be sent to enhancement (ENH) layer encoder 20 for use as an inter-layer reference picture to predict video blocks in a picture of at least one of the enhancement layers encoded by enhancement layer encoder 20. The base layer decoded picture may be up-sampled to have the same resolution as at least one of the enhancement layers and stored in sub-DPB 66 of enhancement layer encoder 20. In some examples, the base layer decoded picture in sub-DPB 66 may be marked as a long-term reference picture. In other examples, sub-DPB 66 may only hold a single base layer decoded picture for use as an inter-layer reference picture for co-located enhancement layer pictures in one or more of the enhancement layers encoded by enhancement layer encoder 20.

Enhancement layer encoder 20 may perform inter-layer prediction in a similar manner as inter prediction described above with respect to FIG. 2, except the up-sampled base layer decoded picture stored in sub-DPB 66 may be used as the reference picture for a co-located enhancement layer picture in an enhancement layer as opposed to one or more neighboring enhancement layer decoded pictures stored in DPB 64. As illustrated in FIG. 4, enhancement layer encoder 20 receives the base layer decoded pictures from base layer encoder 100. In this case, base layer encoder 100 may be considered as part of the external system. In other examples, enhancement layer encoder 20 may receive the base layer decoded picture from a base layer decoder, a control system of a base layer encoder, or a control system of a base layer decoder.

The techniques of this disclosure enable enhancement layer encoder 20 to generate a conforming bitstream for codec-hybrid multi-layer video coding. For example, when the base layer is provided by an external system, e.g., base layer encoder 100, the enhancement layer bitstream generated by enhancement layer encoder 20 includes enhancement layer encoded pictures that belong to one or more enhancement layers of the video data, without including any base layer encoded pictures that belong to the base layer. As illustrated in FIG. 4, multi-layer video encoder 90 may also include a multiplexer ("mux") 112 that combines the conforming enhancement layer bitstream output by enhancement layer encoder 20 and the base layer bitstream output by base layer encoder 100. The combined bitstream may be transmitted to another device (e.g., multi-layer video decoder 120 of FIG. 5) or archived for later transmission or retrieval.

Figure 5:
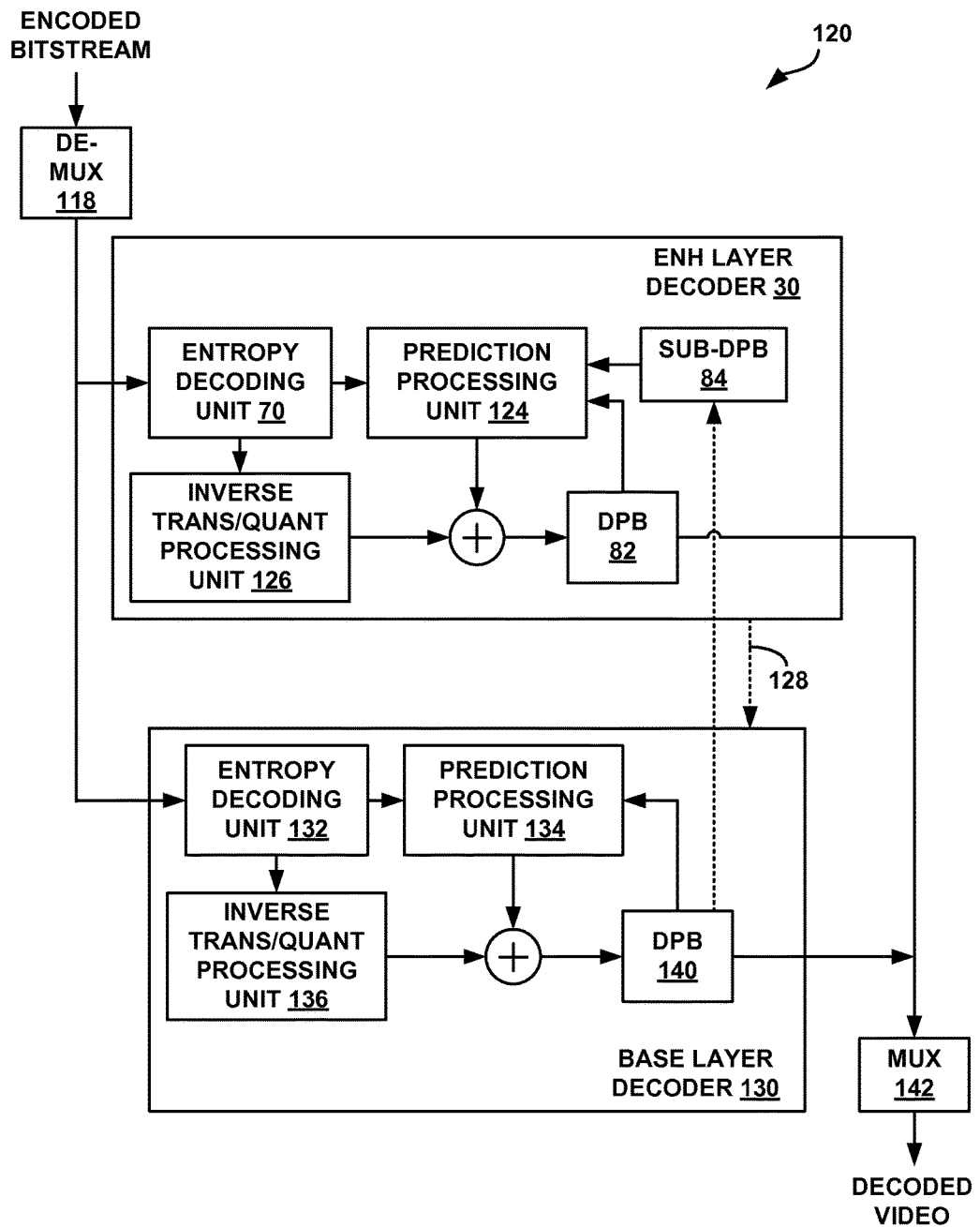
FIG. 5 is a block diagram illustrating an example multi-layer video decoder that may support codec-hybrid multi-layer video decoding in accordance with the techniques of this disclosure.

FIG. 5 is a block diagram illustrating an example multi-layer video decoder 120 that may support codec-hybrid multi-layer video decoding in accordance with the techniques of this disclosure. Multi-layer video decoder 120 includes a base layer decoder 130 and video decoder 30 from FIG. 3 operating as an enhancement layer decoder. Base layer decoder 130 may be configured to decode video data according to a first video codec standard, such as the H.264/AVC standard. Enhancement layer decoder 30 may be configured to decode video data according to a different, second video codec standard, such as the H.265/HEVC standard or one of the multi-layer extensions of HEVC. According to the disclosed techniques, enhancement layer decoder 30 may be further configured to decode conforming bitstreams and signal output indications to base layer decoder 130 in codec-hybrid multi-layer video coding.

As illustrated in FIG. 5, multi-layer video decoder 120 may include a de-multiplexer ("de-mux") 118 that splits a combined encoded bitstream into an enhancement layer bitstream to be decoded by enhancement layer decoder 30 and a base layer bitstream to be decoded by base layer decoder 130. Enhancement layer decoder 30 may operate as described in FIG. 3 above to decode video blocks within pictures of one or more enhancement layers included in the enhancement layer bitstream. Some of the components illustrated in FIG. 3 have been condensed for illustration purposes. For example, prediction processing unit 124 may operate as motion compensation unit 72 and intra prediction processing unit 74 from FIG. 3. Inverse transform/quantization processing unit 126 may operate as inverse quantization unit 76 and inverse transform processing unit 78 from FIG. 3.

Base layer decoder 130 may decode video blocks of pictures of a base layer included in the base layer bitstream. Base layer decoder 130 may decode the video blocks in a similar manner as described above with respect to video decoder 30 of FIG. 3. In the example of FIG. 5, base layer decoder 130 includes an entropy decoding unit 132, a prediction processing unit 134, an inverse transform/quantization processing unit 136, and a decoded picture buffer (DPB) 140. Although not shown for brevity, base layer decoder 130 may also include one or more filters that filter base layer decoded pictures stored in DPB 140.

Entropy decoding unit 132 may be similar to entropy decoding unit 70 of video decoder 30 from FIG. 3. Entropy decoding unit 132 entropy decodes the base layer bitstream to generate quantized coefficients, motion vectors or intra-prediction mode indicators, and other syntax elements. Entropy decoding unit 132 forwards the motion vectors and other syntax elements to prediction processing unit 134, and forwards the quantized coefficients to inverse transform/quantization processing unit 136.

Prediction processing unit 134 may be similar to motion compensation unit 72 and intra prediction processing unit 74 of video decoder 30 from FIG. 3. When a current picture is intra-coded, prediction processing unit 134 may generate prediction data for a video block of the current picture based on a signaled intra prediction mode and data from previously decoded blocks of the current picture. When the current picture is inter-coded, prediction processing unit 134 produces predictive blocks for a video block of the current picture based on the motion vectors and other syntax elements received from entropy decoding unit 132. The predictive blocks may be produced from one of the reference pictures within DPB 140.

Inverse transform/quantization processing unit 136 may be similar to inverse quantization unit 76 and inverse transform processing unit 78 of video decoder 30 from FIG. 3. Inverse transform/quantization processing unit 136 inverse quantizes, i.e., de-quantizes, the quantized transform coefficients provided in the base layer bitstream and decoded by entropy decoding unit 132. Inverse transform/quantization processing unit 136 then applies an inverse transform to the transform coefficients in order to produce residual blocks. Base layer decoder 130 forms a decoded video block by summing the residual blocks from inverse transform/quantization processing unit 136 with the corresponding predictive blocks generated by prediction processing unit 134. The decoded video blocks of a base layer decoded picture are then stored in DPB 140, which stores reference pictures used for prediction of video blocks in subsequent base layer pictures. DPB 140 also stores base layer decoded pictures of the base layer for later output for display.

According to the disclosed techniques, the base layer decoded picture may also be sent to enhancement layer decoder 30 for use as an inter-layer reference picture for prediction of video blocks in a picture of at least one of the enhancement layers decoded by enhancement layer decoder 30. The base layer decoded picture may be up-sampled to have the same resolution as at least one of the enhancement layers and stored in sub-DPB 84 of enhancement layer decoder 30. In some examples, the base layer decoded picture in sub-DPB 84 may be marked as a long-term reference picture. In other examples, sub-DPB 84 may only hold a single base layer decoded picture for use as an inter-layer reference picture for co-located enhancement layer pictures in one or more of the enhancement layers decoded by enhancement layer decoder 30.

Enhancement layer decoder 30 may perform inter-layer prediction in a similar manner as inter prediction described above with respect to FIG. 3, except the up-sampled base layer decoded picture stored in sub-DPB 84 may be used as the reference picture for a co-located enhancement layer picture in an enhancement layer as opposed to one or more neighboring enhancement layer decoded pictures stored in DPB 82. As illustrated in FIG. 5, enhancement layer decoder 30 receives the base layer decoded pictures from base layer decoder 130. In this case, base layer decoder 130 may be considered as part of the external system. In other examples, enhancement layer decoder 30 may receive the base layer decoded picture from a control system of a base layer decoder.

The techniques of this disclosure enable enhancement layer decoder 30 to signal output indications for codec-hybrid multi-layer video coding. Enhancement layer decoder 30 receives an indication of which layers are target output layers to be output for display in the enhancement layer bitstream. If any of the enhancement layers included in the enhancement layer bitstream are identified as target output layers, enhancement layer decoder 30 outputs the enhancement layer decoded pictures of the target output enhancement layers for display.

Base layer decoder 130 does not receive an indication of the target output layers in the base layer bitstream. According to the disclosed techniques, enhancement layer decoder 30 sends an output indication 128 to base layer decoder 130 indicating whether the base layer or specific base layer decoded pictures need to be output by base layer decoder 130 for display. In one example, output indication 128 may be a flag that indicates whether or not the base layer is identified as a target output layer to be output for display. In another example, output indication 128 may be a separate flag for each of the base layer decoded pictures of the base layer indicating whether or not a respective base layer decoded picture is to be output for display. In some cases, the separate flag for each of the base layer decoded pictures of the base layer may only be signaled as output indication 128 when the base layer is not a target output layer to be output for display. Upon receiving output indication 128, if the base layer or any specific base layer decoded pictures are identified to be output, base layer decoder 130 outputs the identified base layer decoded pictures of the base layer for display.

The techniques of this disclosure also specify decoder conformance for codec-hybrid multi-layer video coding. For example, when the base layer is provided by an external system, e.g., base layer decoder 130, enhancement layer decoder 30 is capable of decoding a conforming bitstream for codec-hybrid multi-layer video coding, specified in this disclosure as including enhancement layer encoded pictures that belong to an enhancement layer, without including any base layer encoded pictures that belong to a base layer. In addition, when the base layer is provided by an external system, e.g., base layer decoder 130, enhancement layer decoder 30 outputs the enhancement layer decoded pictures of the enhancement layer identified as one of the target output layers and sends output indication 128 for the base layer to the external system, e.g., base layer decoder 130.

As illustrated in FIG. 5, multi-layer video decoder 120 may also include a multiplexor ("mux") 142 that combines the enhancement layer decoded pictures of the one or more enhancement layers identified as target output layers and output by enhancement layer decoder 30 and, when the base layer is identified as one of the target output layers, the base layer decoded pictures of the base layer output by base layer decoder 130. The combined decoded pictures may be presented on a display device, such as display device 32 of FIG. 1.

Figure 6:
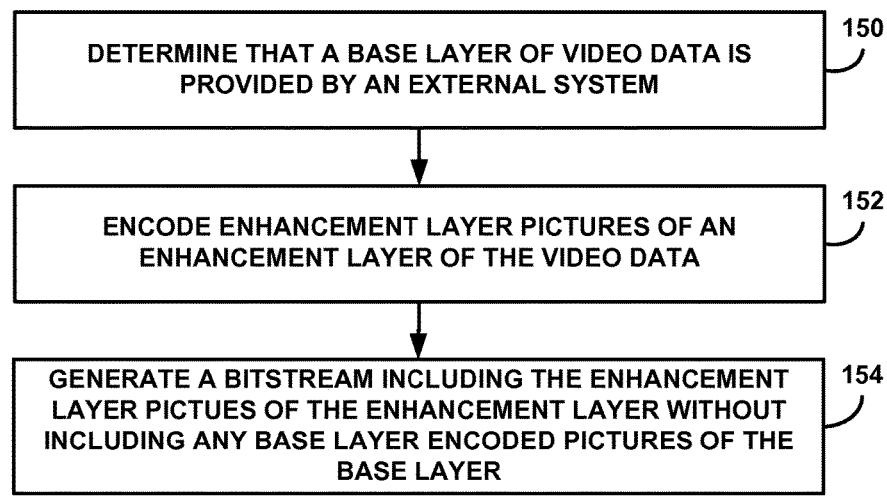
FIG. 6 is a flowchart illustrating an example operation of encoding conforming bitstreams in codec-hybrid multi-layer video coding.

FIG. 6 is a flowchart illustrating an example operation of encoding conforming bitstreams in codec-hybrid multi-layer video coding. The example operation of FIG. 6 is described herein as being performed by video encoder 20 of FIG. 2 and FIG. 4. As described in detail above, video encoder 20 is configured to support codec-hybrid multi-layer video coding in according with the techniques of this disclosure. Codec-hybrid multi-layer video coding includes a base layer that conforms to a first video coding standard, and at least one enhancement layer that conforms to a second video coding standard that is different than the first video coding standard. For example, the base layer may conform to the H.264/AVC standard and at least one enhancement layer may conform to one of the multi-layer extension to the H.265/HEVC standard, such as SHVC.

Video encoder 20 first determines that a base layer of video data is provided by an external system (150). The external system may be a base layer video decoding device, e.g., base layer decoder 130 from FIG. 6, or a control system for a base layer video decoding device. Video encoder 20 may receive one or more base layer decoded pictures that belong to the base layer from the external system, and store the base layer decoded pictures in sub-DPB 66. Video encoder 20 then encodes enhancement layer pictures that belong to an enhancement layer of the video data (152). Video encoder 20 may use the base layer decoded pictures stored in sub-DPB 66 to generate inter-layer reference pictures for encoding enhancement layer pictures that belong to an enhancement layer of the video data.

In accordance with techniques of this disclosure, video encoder 20 generates a bitstream including the enhancement layer encoded pictures of the enhancement layer, without including any base layer encoded pictures that belong to the base layer (154). The techniques of this disclosure specify bitstream conformance in codec-hybrid multi-layer video coding. When the base layer of the video data is provided by the external system, the bitstream conformance constraints may be the same as in SHVC WD5, e.g., but without consideration of pictures that belong to the base layer. In this case, no base layer encoded pictures are included in the bitstream and base layer decoded pictures are provided by the external system. According to the disclosed techniques, the bitstream generated by video encoder 20 comprises a conforming bitstream if the bitstream includes the enhancement layer encoded pictures that belong to the enhancement layer, without including any base layer encoded pictures that belong to the base layer.

Figure 7:
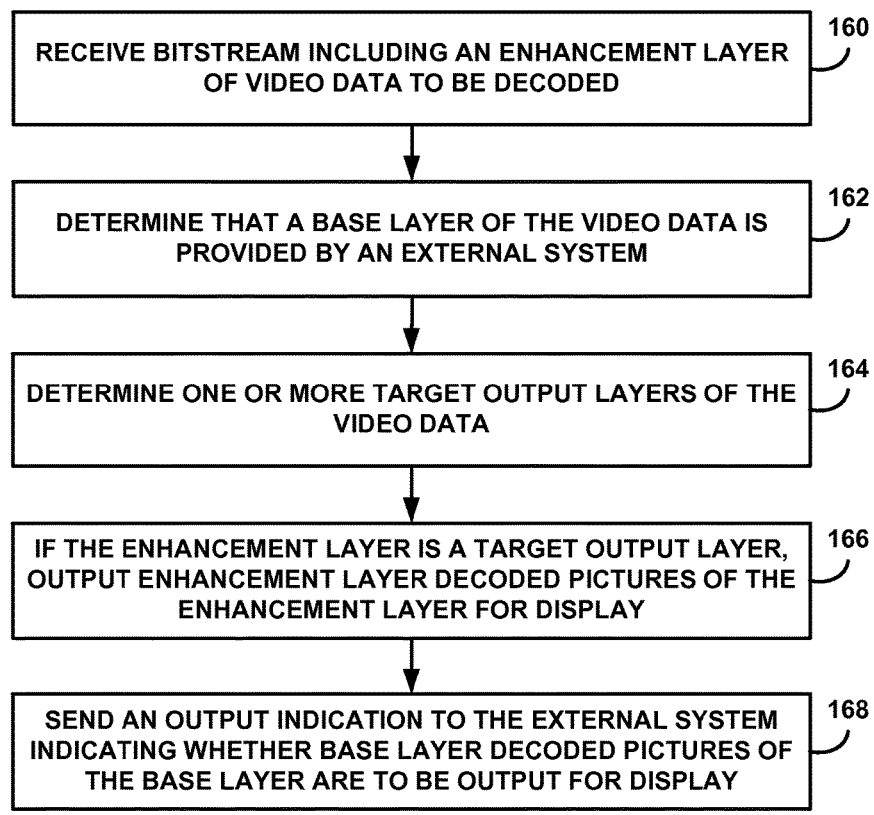
FIG. 7 is a flowchart illustrating an example operation of decoding conforming bitstreams and signaling output indications in codec-hybrid multi-layer video coding.

FIG. 7 is a flowchart illustrating an example operation of decoding conforming bitstreams and signaling output indications in codec-hybrid multi-layer video coding. The example operation of FIG. 7 is described herein as being performed by video decoder 30 of FIG. 3 and FIG. 5. As described in detail above, video decoder 30 is configured to support codec-hybrid multi-layer video coding in according with the techniques of this disclosure. Codec-hybrid multi-layer video coding includes a base layer that conforms to a first video coding standard, and at least one enhancement layer that conforms to a second video coding standard that is different than the first video coding standard. For example, the base layer may conform to the H.264/AVC standard and at least one enhancement layer may conform to one of the multi-layer extension to the H.265/HEVC standard, such as SHVC.

Video decoder 30 receives a bitstream including an enhancement layer of video data to be decoded (160). The enhancement layer bitstream may be a conforming bitstream for codec-hybrid multi-layer video coding, specified in this disclosure as including enhancement layer encoded pictures that belong to an enhancement layer, without including any base layer encoded pictures that belong to a base layer.

Video decoder 30 determines that a base layer of the video data is provided by an external system, e.g., external system 68 from FIG. 3 (162). In some examples, video decoder 30 may receive a syntax element, e.g., vps_base_layer_external_flag, in the enhancement layer bitstream indicating that the base layer is provided by external system 68. External system 68 may be a base layer video decoding device, e.g., base layer decoder 130 from FIG. 5, or a control system for a base layer video decoding device. Video decoder 30 may receive one or more base layer decoded pictures that belong to the base layer from external system 68, and store the base layer decoded pictures in sub-DPB 84. Video decoder 30 may use the base layer decoded pictures stored in sub-DPB 84 to generate inter-layer reference pictures for decoding enhancement layer pictures that belong to the enhancement layer of the video data.

Video decoder 30 then determines one or more target output layers of the video data (164). In some example, video decoder 30 may receive one or more syntax elements, e.g., output_layer_flag, in the enhancement layer bitstream indicating whether each of the layers of the video data is a target output layer to be output for display. If the enhancement layer is identified as one of the target output layers, video decoder 30 outputs enhancement layer decoded pictures of the enhancement layer for display (166).

According to the techniques of this disclosure, video decoder 30 also sends an output indication 86 to external system 68 indicating whether base layer decoded pictures of the base layer are to be output for display (168). As described in more detail above, video decoder 30 receives an indication of the target output layers in the enhancement layer bitstream, but external system 68 does not receive such an indication of the target output layers in a base layer bitstream. External system 68, therefore, does not know which layers are target output layers and, more importantly, does not know whether the base layer should be output for display or whether specific base layer decoded pictures of the base layer should be output for display. The disclosed techniques enable video decoder 30 to send output indication 86 to external system 68 to inform external system 68 whether the base layer or specific base layer decoded pictures need to be output.

In one example, video decoder 30 sends a flag to external system 68 indicating whether the base layer is one of the target output layers to be output for display. For example, the flag, e.g., BaseLayerOutputFlag, may be set equal to 0 when the base layer is not a target output layer and does not need to be output, and may be set equal to 1 when the base layer is a target output layer and does need to be output. In another example, instead of sending one flag indicating whether or not to output the entire base layer, video decoder 30 may send a separate flag for each of the base layer decoded pictures that belong to the base layer to external system 68 indicating whether or not to output the respective picture for display. For example, the flag, e.g., BaseLayerPicOutputFlag, for a given one of the base layer decoded pictures may be set equal to 0 when the given picture is not to be output, and may be set equal to 1 when the given picture is to be output.

In some cases, video decoder 30 only signals the separate flag, e.g., BaseLayerPicOutputFlag, for each of the base layer decoded pictures that belong to the base layer when the base layer is not a target output layer to be output for display, e.g., BaseLayerOutputFlag=0. In this way, video decoder 30 may indicate whether to output a specific one of the base layer decoded pictures that belongs to the base layer even though the entire base layer is not a target output layer to be output for display.

Video decoder 30 comprises a conforming decoder capable of decoding a conforming bitstream for codec-hybrid multi-layer video coding, specified in this disclosure as including enhancement layer encoded pictures that belong to an enhancement layer, without including any base layer encoded pictures that belong to a base layer. The techniques of this disclosure specify decoder conformance in codec-hybrid multi-layer video coding. When the base layer of the video data is provided by the external system, the decoder conformance constraints may be the same as in SHVC WD5, e.g., but further require the receipt of base layer decoded pictures from the external system and the signaling of an output indicator for the base layer to the external system. According to the disclosed techniques, video decoder 30 comprises a conforming decoder if video decoder 30 outputs the enhancement layer decoded pictures of the enhancement layer identified as one of the target output layers and sends the output indication for the base layer to external system 68.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

receiving, at an enhancement layer video decoder, a bitstream including at least one enhancement layer of video data to be decoded, wherein the at least one enhancement layer is coded according to a first video codec standard;

determining, by the enhancement layer video decoder and from the bitstream, that a base layer of the video data is provided by an external system, wherein the base layer is coded according to a second video codec standard that is different than the first video codec standard;

receiving, at the enhancement layer video decoder and from the external system, one or more base layer decoded pictures that belong to the base layer;

storing, at the enhancement layer video decoder, the one or more base layer decoded pictures received from the external system;

decoding, by the enhancement layer video decoder, enhancement layer pictures that belong to the at least one enhancement layer of the video data, wherein decoding the enhancement layer pictures comprises performing inter-layer prediction of one or more of the enhancement layer pictures using the one or more base layer decoded pictures stored at the enhancement layer video decoder;

determining, by the enhancement layer video decoder and from the bitstream, one or more target output layers of the video data;

based on the target output layers including the at least one enhancement layer, outputting, by the enhancement layer video decoder, the enhancement layer decoded pictures that belong to the at least one enhancement layer for display; and based on the base layer being provided by the external system, sending an output indication from the enhancement layer video decoder and to the external system indicating whether the base layer decoded pictures that belong to the base layer are to be output for display, wherein the enhancement layer video decoder comprises a conforming video decoder for the first video codec standard where the base layer is provided externally and coded according to the second video codec standard that is different than the first video codec standard, and wherein the enhancement layer video decoder is determined to comprise the conforming video decoder based on the enhancement layer video decoder receiving the one or more base layer decoded pictures that belong to the base layer from the external system, outputting the enhancement layer decoded pictures that belong to the at least one enhancement layer included as one of the target output layers, and sending the output indication to the external system.

2. The method of claim 1, wherein sending the output indication to the external system comprises sending a flag to the external system indicating whether the base layer is one of the target output layers to be output for display.

3. The method of claim 1, wherein sending the output indication to the external system comprises sending, for each of the base layer decoded pictures, a flag to the external system indicating whether the respective base layer decoded picture is to be output for display.

4. The method of claim 1, wherein sending the output indication to the external system comprises:

sending a first flag to the external system indicating whether the base layer is one of the target output layers to be output for display; and based on the base layer not being one of the target output layers, sending, for each of the base layer decoded pictures, a second flag to the external system indicating whether the respective base layer decoded picture is to be output for display.

5. The method of claim 1, wherein the base layer conforms to a first video coding standard, and wherein the at least one enhancement layer conforms to a second video coding standard that is different than the first video coding standard.

6. The method of claim 1, wherein the external system comprises one of a base layer video decoding device or a control system for the base layer video decoding device.

7. An enhancement layer video decoding device comprising:

a memory configured to store video data; and one or more processors in communication with the memory and configured to:

receive a bitstream including at least one enhancement layer of video data to be decoded, wherein the at least one enhancement layer is coded according to a first video codec standard, determine, from the bitstream, that a base layer of the video data is provided by an external system, wherein the base layer is coded according to a second video codec standard that is different than the first video codec standard, receive one or more base layer decoded pictures that belong to the base layer from the external system, store the one or more base layer decoded pictures received from the external system, decode enhancement layer pictures that belong to the at least one enhancement layer of the video data, wherein the one or more processors are configured to perform inter-layer prediction of one or more of the enhancement layer pictures using the one or more base layer decoded pictures stored at the enhancement layer video decoding device, determine, from the bitstream, one or more target output layers of the video data, based on the target output layers including the at least one enhancement layer, output the enhancement layer decoded pictures that belong to the at least one enhancement layer for display, and based on the base layer being provided by the external system, send an output indication from the enhancement layer video decoding device and to the external system indicating whether the base layer decoded pictures that belong to the base layer are to be output for display, wherein the enhancement layer video decoding device comprises a conforming video decoder for the first video codec standard where the base layer is provided externally and coded according to the second video codec standard that is different than the first video codec standard, and wherein the enhancement layer video decoding device is determined to comprise the conforming video decoder based on the one or more processors of the enhancement layer video decoding device receiving the one or more base layer decoded pictures that belong to the base layer from the external system, outputting the enhancement layer decoded pictures that belong to the at least one enhancement layer included as one of the target output layers, and sending the output indication to the external system.

8. The device of claim 7, wherein, to send the output indication to the external system, the one or more processors are configured to send a flag to the external system indicating whether the base layer is one of the target output layers to be output for display.

9. The device of claim 7, wherein, to send the output indication to the external system, the one or more processors are configured to send, for each of the base layer decoded pictures, a flag to the external system indicating whether the respective base layer decoded picture is to be output for display.

10. The device of claim 7, wherein, to send the output indication to the external system, the one or more processors are configured to:

send a first flag to the external system indicating whether the base layer is one of the target output layers to be output for display; and based on the base layer not being one of the target output layers, send, for each of the base layer decoded pictures, a second flag to the external system indicating whether the respective base layer decoded picture is to be output for display.

11. The device of claim 7, wherein the base layer conforms to a first video coding standard, and wherein the at least one enhancement layer conforms to a second video coding standard that is different than the first video coding standard.

12. The device of claim 7, wherein the external system comprises one of a base layer video decoding device or a control system for the base layer video decoding device.

13. An enhancement layer video encoding device comprising:

a memory configured to store video data; and
one or more processors in communication with the memory and configured to:
- determine that a base layer of the video data is provided by an external system, wherein the base layer is coded according to a first video codec standard,
- receive one or more base layer decoded pictures that belong to the base layer from the external system,
- store the one or more base layer decoded pictures received from the external system,
- encode enhancement layer pictures that belong to at least one enhancement layer of the video data, wherein the at least one enhancement layer is coded according to a second video codec standard that is different than the first video codec standard, and wherein the one or more processors are configured to perform inter-layer prediction of one or more of the enhancement layer pictures using the one or more base layer decoded pictures stored at the enhancement layer video encoding device, and
- generate a bitstream including the enhancement layer encoded pictures that belong to the at least one enhancement layer, an indication of whether the enhancement layer is a target output layer, and an indication that the base layer is provided by the external system, and without including any of the base layer decoded pictures that belong to the base layer in the bitstream, wherein the generated bitstream comprises a conforming bitstream for the second video codec standard where the base layer is provided externally and coded according to the first video codec standard that is different than the second video codec standard, and wherein the generated bitstream is determined to comprise the conforming bitstream based on the generated bitstream including the enhancement layer encoded pictures that belong to the at least one enhancement layer without including any of the base layer decoded pictures that belong to the base layer.

14. The device of claim 13, wherein the base layer conforms to a first video coding standard, and wherein the at least one enhancement layer conforms to a second video coding standard that is different than the first video coding standard.

* * * * *